(12) United States Patent
Yamashita et al.

(10) Patent No.: US 10,868,295 B2
(45) Date of Patent: Dec. 15, 2020

(54) POSITIVE ELECTRODE ACTIVE MATERIAL COMPLEX FOR LITHIUM-ION SECONDARY BATTERY, SECONDARY BATTERY USING SAME, AND METHOD FOR PRODUCING POSITIVE ELECTRODE ACTIVE MATERIAL COMPLEX FOR LITHIUM-ION SECONDARY BATTERY

(71) Applicants: TAIHEIYO CEMENT CORPORATION, Minato-ku (JP); DENSO CORPORATION, Kariya-shi (JP)

(72) Inventors: Hiroki Yamashita, Sakura (JP); Yuko Hirayama, Sakura (JP); Toshihito Shimada, Sakura (JP); Takaaki Ogami, Sakura (JP); Shuhei Yoshida, Kariya (JP); Satoru Suzuki, Kariya (JP)

(73) Assignees: TAIHEIYO CEMENT CORPORATION, Minato-ku (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/617,667

(22) PCT Filed: May 18, 2018

(86) PCT No.: PCT/JP2018/019251
§ 371 (c)(1),
(2) Date: Nov. 27, 2019

(87) PCT Pub. No.: WO2018/221263
PCT Pub. Date: Dec. 6, 2018

(65) Prior Publication Data
US 2020/0161632 A1 May 21, 2020

(30) Foreign Application Priority Data

May 29, 2017 (JP) .................................. 2017-105413
Mar. 28, 2018 (WO) ................... PCT/JP2018/012666

(51) Int. Cl.
| | |
|---|---|
| H01M 4/131 | (2010.01) |
| H01M 4/1391 | (2010.01) |
| H01M 4/505 | (2010.01) |
| H01M 4/66 | (2006.01) |
| H01M 4/80 | (2006.01) |
| H01M 10/0525 | (2010.01) |
| H01M 4/02 | (2006.01) |

(52) U.S. Cl.
CPC ......... *H01M 4/131* (2013.01); *H01M 4/1391* (2013.01); *H01M 4/505* (2013.01); *H01M 4/663* (2013.01); *H01M 4/806* (2013.01); *H01M 10/0525* (2013.01); *H01M 2004/028* (2013.01)

(58) Field of Classification Search
CPC .......... H01M 10/052; H01M 10/0525; H01M 10/054; H01M 2004/028; H01M 4/04; H01M 4/0471; H01M 4/136; H01M 4/1397; H01M 4/362; H01M 4/5825; H01M 4/583; H01M 4/625; H01M 4/36; H01M 4/58

See application file for complete search history.

(56) References Cited

U.S. PATENT DOCUMENTS

| | | |
|---|---|---|
| 2004/0096743 A1 | 5/2004 | Okae et al. |
| 2010/0112445 A1 | 5/2010 | Park et al. |
| 2010/0133467 A1 | 6/2010 | Ikegawa |
| 2010/0203388 A1 | 8/2010 | Kim et al. |
| 2010/0310940 A1 | 12/2010 | Kim et al. |
| 2013/0183579 A1 | 7/2013 | Kim et al. |
| 2016/0013486 A1 | 1/2016 | Hirai et al. |
| 2017/0040647 A1 | 2/2017 | Jang et al. |
| 2017/0301919 A1 | 10/2017 | Yamashita et al. |
| 2018/0053929 A1 | 2/2018 | Yamashita et al. |

FOREIGN PATENT DOCUMENTS

| | | |
|---|---|---|
| JP | 2001-85006 A | 3/2001 |
| JP | 2004-87299 A | 3/2004 |
| JP | 2007-335245 A | 12/2007 |
| JP | 2010-517238 A | 5/2010 |
| JP | 2011-502332 A | 1/2011 |
| JP | 2013-149615 A | 8/2013 |
| JP | 2016-72029 A | 5/2016 |
| JP | 2016-184569 A | 10/2016 |
| JP | 6549807 B2 | 7/2019 |
| KR | 10-2010-0052116 A | 5/2010 |
| KR | 10-2015-0089967 A | 8/2015 |

(Continued)

OTHER PUBLICATIONS

International Search Report dated Jul. 3, 2018 in PCT/JP2018/019251 filed May 18, 2018.

(Continued)

*Primary Examiner* — Adam A Arciero
(74) *Attorney, Agent, or Firm* — Obion, McClelland, Maier & Neustadt, L.L.P.

(57) ABSTRACT

There is provided a positive electrode active material composite for a lithium-ion secondary battery, in which, when using as a positive electrode active material of the lithium-ion secondary battery, it can effectively improve high-temperature cycle characteristics. In the positive electrode active material composite for a lithium-ion secondary battery, only on the surface of a lithium transition metal oxide secondary particle (A) composed of one or more of the lithium transition metal oxide particles represented by the following formula (I): $LiNi_aCo_bMn_cM^1{}_xO_2$ ... (I) or the following formula (II): $LiNi_dCo_eAl_fM^2{}_yO_2$ ... (II), a lithium-based polyanion particles (B) is composited with lithium transition metal oxide particles under a specific condition, the lithium-based polyanion particles (B) being represented by the following formula (III) or (III)': $Li_gMn_hFe_iM^3{}_zPO_4$ ... (III) or $Mn_hFe_iM^3{}_zPO_4$ ... (III)' and being supporting carbon (C) on a surface thereof.

8 Claims, No Drawings

(56) References Cited

FOREIGN PATENT DOCUMENTS

| | | |
|---|---|---|
| WO | WO 2008/105490 A1 | 9/2008 |
| WO | WO 2014/133069 A1 | 9/2014 |
| WO | WO 2016/047491 A1 | 3/2016 |

OTHER PUBLICATIONS

Notice of Reasons for Refusal dated Feb. 25, 2019 in Japanese Patent Application No. 2018-563738 (with unedited computer generated English translation), 10 Pages.

Decision to Grant a Patent dated Jun. 17, 2019 in Japanese Patent Application No. 2018-563738 (with unedited computer generated English translation), 5 Pages.

Office Action dated Nov. 20, 2019 in Korean Patent Application No. 10-2019-7029243 (with English translation), 15 pages.

Kyu-Young Park et al., "Factors that Affect the Phase Behavior of Multi-Component Olivine (LiFe$_x$Mn$_y$Co$_{1-x-y}$PO$_4$; 0<x, y<1) in Lithium Rechargeable Batteries: One-Phase Reaction vs. Two-Phase Reaction", J. Electrochem. Soc. 2013, vol. 160, Issue 3, pp. A444-A448 and cover page.

POSITIVE ELECTRODE ACTIVE MATERIAL COMPLEX FOR LITHIUM-ION SECONDARY BATTERY, SECONDARY BATTERY USING SAME, AND METHOD FOR PRODUCING POSITIVE ELECTRODE ACTIVE MATERIAL COMPLEX FOR LITHIUM-ION SECONDARY BATTERY

TECHNICAL FIELD

The present invention relates to a positive electrode active material composite having a layered rock salt structure for a lithium-ion secondary battery, a lithium-ion secondary battery comprising the same as a positive electrode active material and being excellent in the high-temperature cycle characteristic, and a method for producing a positive electrode active material composite having a layered rock salt structure for a lithium-ion secondary battery.

BACKGROUND ART

Conventionally, lithium transition metal oxides are used as positive electrode active materials capable of constituting high-output high-capacity lithium ion secondary batteries. Such lithium transition metal oxides take on a layered crystal structure in which a lithium atom layer and a transition metal atom layer are alternately stacked through an oxygen atom layer, and are known also as having a so-called rock salt structure in which one lithium atom per one atom of a transition metal is contained.

In a lithium-ion secondary battery using such a lithium transition metal oxide as a positive electrode active material, although charge and discharge are carried out by intercalation and deintercalation of lithium ions in and from the lithium transition metal oxide, a capacity reduction is usually caused as the charge and discharge cycle is repeated; particularly in long-term usage, there arises such a risk that the capacity reduction of the battery becomes remarkable. This is conceivably caused by that dissolving-out of transition metal components of the lithium transition metal oxide in an electrolyte solution in the charge time makes collapsing of such a crystal structure easy. Particularly at a higher temperature, the amount of the transition metals dissolved out becomes larger, affecting largely the cycle characteristic. Further there arises also such a risk that when the crystal structure of the lithium transition metal oxide collapses, the transition metal components of the lithium transition metal oxide dissolve out in a surrounding electrolyte solution, reducing the thermal stability and impairing the safety.

Battery materials to be used, for example, for vehicular batteries, however, are demanded to have such excellent durability that even when the batteries undergo charge and discharge cycles repeated as many as 1,000 or more cycles, a battery capacity at a specific level or higher can be maintained; and to meet the demand, various developments have been made. For example, Patent Literature 1 discloses a lithium transition metal oxide in which primary particles of 1 μm to 8 μm in average particle size aggregate and form secondary particles of 5 μm to 30 μm in average particle size and the voidage of the secondary particles is 30% or less. Further Patent Literature 2 discloses a lithium transition metal oxide in which the true density is made to be 4.40 to 4.80 g/cm³ and proper voids are made to be present in a positive electrode active material while a high volume energy density is provided, and also describes a specific example of an electrode active material having a lithium transition metal oxide of its core portion and a lithium transition metal oxide of its shell portion having a composition different from that of the core portion.

CITATION LIST

Patent Literature

Patent Literature 1: JP-A-2001-85006
Patent Literature 2: WO-A 2014/133069

SUMMARY OF INVENTION

Technical Problem

In the technology described in either Patent Literature, however, it is difficult to sufficiently improve the cycle characteristic of a lithium transition metal oxide, and in the present situation, further improvement is needed.

Therefore, a problem of the present invention is to provide a positive electrode active material composite for a lithium-ion secondary battery, in which when being used as a positive electrode active material for the lithium-ion secondary battery, it can effectively improve the high-temperature cycle characteristic.

Solution to Problem

Then, as a result of exhaustive studies, the present inventors found that only on the surface of a lithium transition metal oxide secondary particle composed of the specific composite oxide particles, by compositing the lithium transition metal oxide particles with specific lithium-based polyanion particles having a specific mass ratio to the lithium transition metal oxide secondary particle, there can be obtained a positive electrode active material composite for a lithium-ion secondary battery, in which when being used as a positive electrode active material of the lithium-ion secondary battery, effectively suppresses a reaction with an electrolyte solution and causes no output reduction even when undergoing charge and discharge cycles repeated many times.

That is, the present invention provides a positive electrode active material composite for a lithium-ion secondary battery, in which only on a surface of a lithium transition metal oxide secondary particle (A) composed of one or more of the lithium transition metal oxide particles represented by the following formula (I):

$$LiNi_aCo_bMn_cM^1_xO_2 \qquad (I)$$

wherein $M^1$ denotes one or more elements selected from the group consisting of Mg, Ti, Nb, Fe, Cr, Si, Al, Ga, V, Zn, Cu, Sr, Mo, Zr, Sn, Ta, W, La, Ce, Pb, Bi and Ge; and a, b, c and x are numbers satisfying $0.3 \leq a < 1$, $0 < b \leq 0.7$, $0 < c \leq 0.7$, $0 \leq x \leq 0.3$ and $3a+3b+3c+(\text{a valence of } M^1) \times x = 3$, or by the following formula (II):

$$LiNi_dCo_eAl_fM^2_yO_2 \qquad (II)$$

wherein $M^2$ denotes one or more elements selected from the group consisting of Mg, Ti, Nb, Fe, Cr, Si, Ga, V, Zn, Cu, Sr, Mo, Zr, Sn, Ta, W, La, Ce, Pb, Bi and Ge; and d, e, f and y are numbers satisfying $0.4 \leq d < 1$, $0 < e \leq 0.6$, $0 < f \leq 0.3$, $0 \leq y \leq 0.3$ and $3d+3e+3f+(\text{a valence of } M^2) \times y = 3$, lithium-based polyanion particles (B) which are represented by the following formula (III) or (III)':

$$Li_gMn_hFe_iM^3_zPO_4 \qquad (III)$$

wherein $M^3$ denotes Co, Ni, Ca, Sr, Y, Zr, Mo, Ba, Pb, Bi, La, Ce, Nd or Gd; and g, h, i and z denote numbers satisfying $0<g\leq1.2$, $0\leq h\leq1.2$, $0\leq i\leq1.2$, $0\leq z\leq0.3$ and $h+i\neq0$, and g+(a valence of Mn)×h+(a valence of Fe)×i+(a valence of $M^3$)×z=3, and $$Mn_hFe_iM^3_zPO_4 \quad (III)'$$

wherein $M^3$ has the same meaning as in the formula (III); and h', i' and z' in the above formula (III)' denote numbers satisfying $0\leq h'\leq1.2$, $0\leq i'\leq1.2$, $0\leq z'\leq0.3$ and $h'+i'\neq0$, and (a valence of Mn)×h'+(a valence of Fe)×i'+(a valence of $M^3$)×z'=3, and which carbon (c) is supported on the surface thereof, are composited with lithium transition metal oxide particles;

wherein an amount of the carbon (c) supported on the surface of the lithium-based polyanion particles (B) is 0.1 mass % or more and less than 18 mass % in 100 mass % of the lithium-based polyanion particles (B);

an average particle size of the lithium-based polyanion particles (B) is 50 to 200 nm; and a mass ratio of a content of the lithium transition metal oxide secondary particles (A) to a content of the lithium-based polyanion particles (B), ((A):(B)), is 95:5 to 65:35.

Advantageous Effects of Invention

According to the positive electrode active material composite for a lithium-ion secondary battery of the present invention, it can prevent collapsing of a crystal structure though having a layered rock salt structure, and in the lithium-ion secondary battery obtained by using the same as a positive electrode active material, can effectively enhance the high-temperature cycle characteristic.

DESCRIPTION OF EMBODIMENTS

Hereinafter, the present invention will be described in detail.

The positive electrode active material composite for a lithium-ion secondary battery according to the present invention is the one in which only on a surface of a lithium transition metal oxide secondary particle (A) composed of one or more of the lithium transition metal oxide particles represented by the following formula (I):

$$LiNi_aCo_bMn_cM^1_xO_2 \quad (I)$$

wherein $M^1$ denotes one or more elements selected from the group consisting of Mg, Ti, Nb, Fe, Cr, Si, Al, Ga, V, Zn, Cu, Sr, Mo, Zr, Sn, Ta, W, La, Ce, Pb, Bi and Ge; and a, b, c and x are numbers satisfying $0.3\leq a<1$, $0<b\leq0.7$, $0<c\leq0.7$, $0\leq x\leq0.3$ and 3a+3b+3c+(a valence of $M^1$)×x=3, or by the following formula (II):

$$LiNi_dCo_eAl_fM^2_yO_2 \quad (II)$$

wherein $M^2$ denotes one or more elements selected from the group consisting of Mg, Ti, Nb, Fe, Cr, Si, Ga, V, Zn, Cu, Sr, Mo, Zr, Sn, Ta, W, La, Ce, Pb, Bi and Ge; and d, e, f and y are numbers satisfying $0.4\leq d<1$, $0<e\leq0.6$, $0<f\leq0.3$, $0\leq y\leq0.3$ and 3d+3e+3f+(a valence of $M^2$)×y=3, lithium-based polyanion particles (B) which are represented by the following formula (III) or (III)':

$$Li_gMn_hFe_iM^3_zPO_4 \quad (III)$$

wherein $M^3$ denotes Co, Ni, Ca, Sr, Y, Zr, Mo, Ba, Pb, Bi, La, Ce, Nd or Gd; and g, h, i and z denote numbers satisfying $0<g\leq1.2$, $0\leq h\leq1.2$, $0\leq i\leq1.2$, $0\leq z\leq0.3$ and $h+i\neq0$, and g+(a valence of Mn)×h+(a valence of Fe)×i+(a valence of $M^3$)×z=3, and $$Mn_hFe_iM^3_zPO_4 \quad (III)'$$

wherein $M^3$ has the same meaning as in the formula (III); and h', i' and z' in the above formula (III)' denote numbers satisfying $0\leq h'\leq1.2$, $0\leq i'\leq1.2$, $0\leq z'\leq0.3$ and $h'+i'\neq0$, and (a valence of Mn)×h'+(a valence of Fe)×i'+(a valence of $M^3$)×z'=3, in which a carbon (c) is supported on the surface thereof, are composited with lithium transition metal oxide particles; and in which an amount of the carbon (c) supported on the surface of the lithium-based polyanion particles (B) is 0.1 mass % or more and less than 18 mass % in 100 mass % of the lithium-based polyanion particles (B);

an average particle size of the lithium-based polyanion particles (B) is 50 to 200 nm; and a mass ratio of a content of the lithium transition metal oxide secondary particles (A) to a content of the lithium-based polyanion particles (B), ((A):(B)), is 95:5 to 65:35.

Both the lithium nickel composite oxide (a so-called Li—Ni—Co—Mn oxide, and hereinafter, referred to as "NCM-based composite oxide") particle represented by the above formula (I) and the lithium nickel composite oxide (a so-called Li—Ni—Co—Al oxide, and hereinafter, referred to as "NCA-based composite oxide") particle represented by the above formula (II) are a particle having a layered rock salt structure.

$M^1$ in the above formula (I) denotes one or more elements selected from the group consisting of Mg, Ti, Nb, Fe, Cr, Si, Al, Ga, V, Zn, Cu, Sr, Mo, Zr, Sn, Ta, W, La, Ce, Pb, Bi and Ge.

Then a, b, c and x in the above formula (I) are numbers satisfying $0.3\leq a<1$, $0<b\leq0.7$, $0<c\leq0.7$, $0\leq x\leq0.3$ and 3a+3b+3c+(a valence of $M^1$)×x=3.

In the NCM-based composite oxide represented by the above formula (I), Ni, Co and Mn are known to be excellent in the electron conductivity and to contribute to the battery capacity and the output characteristic. Then, from the viewpoint of the cycle characteristic, it is preferable that part of such transition metals be substituted by other metal elements $M^1$. It is conceivable that since the substitution by these metal elements $M^1$ stabilizes the crystal structure of the NCM-based composite oxide represented by the formula (I), even when charge and discharge is repeated, collapsing of the crystal structure can be suppressed, and the excellent cycle characteristic can be attained.

Specific examples of the NCM-based composite oxide represented by the above formula (I) include $LiNi_{0.33}Co_{0.33}Mn_{0.34}O_2$, $LiNi_{0.8}Co_{0.1}Mn_{0.1}O_2$, $LiNi_{0.6}Co_{0.2}Mn_{0.2}O_2$, $LiNi_{0.2}Co_{0.4}Mn_{0.4}O_2$, $LiNi_{0.33}Co_{0.31}Mn_{0.33}Mg_{0.03}O_2$ and $LiNi_{0.33}Co_{0.31}Mn_{0.33}Zn_{0.03}O_2$. Among these, in the case of giving importance to the discharge capacity, preferable are compositions having a large amount of Ni, such as $LiNi_{0.8}Co_{0.1}Mn_{0.1}O_2$ and $LiNi_{0.6}Co_{0.2}Mn_{0.2}O_2$; and in the case of giving importance to the cycle characteristic, preferable are compositions having a small amount of Ni, such as $LiNi_{0.33}Co_{0.33}Mn_{0.34}O_2$ and $LiNi_{0.33}Co_{0.31}Mn_{0.33}Mg_{0.03}O_2$.

Further, Li-NCM-based composite oxide particles represented by the above formulae (I) and having two more mutually different compositions may form a lithium transition metal oxide secondary particle (A) (Li-NCM-based composite oxide secondary particle (A)) of a core-shell structure having a core portion (inner portion) and a shell portion (surface layer portion).

By making the Li-NCM-based composite oxide secondary particle (A) to form the core-shell structure, since Li-NCM-based composite oxide particles having a high concentration of Ni, which would be liable to dissolve out in an electrolyte solution and moreover to release oxygen, which adversely affects safety, or which would be liable to react with a solid electrolyte in the solid electrolyte, can be disposed in the core portion, and Li-NCM-based composite oxide particles having a low concentration of Ni can be disposed in the shell portion, which contacts the electrolyte solution, suppression of reduction of the cycle characteristic and securing of the safety can be more improved. At this time, the core portion may be constituted of one phase, or more phases having different compositions. A form constituting the core portion of two or more phases may be a structure in which a plurality of the phases concentrically make layers and are laminated, or a structure in which the composition transitionally varies from the surface of the core portion toward the central portion thereof.

Further, the shell portion suffices if being formed outside the core portion, and may be of one phase or may be constituted of two or more phases having different compositions, as in the core portion.

Specific examples of such a Li-NCM-based composite oxide secondary particle (A) made to form a core-shell structure of Li-NCM-based composite oxide particles having more different compositions include particles composed, as (core portion)-(shell portion), of $(LiNi_{0.8}Co_{0.1}Mn_{0.1}O_2)$-$(LiNi_{0.2}Co_{0.4}Mn_{0.4}O_2)$, $(LiNi_{0.8}Co_{0.1}Mn_{0.1}O_2)$-$(LiNi_{1/3}Co_{1/3}Mn_{1/3}O_2)$ and $(LiNi_{0.8}Co_{0.1}Mn_{0.1}O_2)$-$(LiNi_{0.33}Co_{0.31}Mn_{0.33}Mg_{0.03}O_2)$.

Further the Li-NCM-based composite oxide particle represented by the above formula (I) may be covered with a metal oxide, a metal fluoride or a metal phosphate salt.

By covering the Li-NCM-based composite oxide particle with the metal oxide, the metal fluoride or the metal phosphate salt, there can be suppressed dissolving-out of a metal component (Ni, Mn, Co or an $M^1$) from the Li-NCM-based composite oxide particle into an electrolyte solution. As such a covering material, there can be used one or more selected from the group consisting of $CeO_2$, $SiO_2$, $MgO$, $Al_2O_3$, $ZrO_2$, $TiO_2$, $ZnO$, $RuO_2$, $SnO_2$, $COO$, $Nb_2O_5$, $CuO$, $V_2O_5$, $MoO_3$, $La_2O_3$, $WO_3$, $AlF_3$, $NiF_2$, $MgF_2$, $Li_3PO_4$, $Li_4P_2O_7$, $LiPO_3$, $Li_2PO_3F$ and $LiPO_2F_2$, or a composited material thereof.

The average particle size of primary particles of the NCM-based composite oxide represented by the above formula (I) is preferably 500 nm or less and more preferably 300 nm or less. By thus making the average particle size of primary particles of the NCM-based composite oxide to be at largest 500 nm or less, there can be suppressed the amount of expansion and contraction of the primary particles along with intercalation and deintercalation of lithium ions, and particle cracking can effectively be prevented. Here, the lower limit value of the average particle size of the primary particles is not especially limited, but is, from the viewpoint of handleability, preferably 50 nm or more.

Then the average particle size of the NCM-based composite oxide secondary particles (A) formed by aggregation of the primary particles is preferably 25 μm or less and more preferably 20 μm or less. When the average particle size of such secondary particles is 25 μm or less, there can be obtained a battery excellent in the high-temperature cycle characteristic. Here, the lower limit value of the average particle size of the secondary particles is not especially limited, but is, from the viewpoint of handleability, preferably 1 μm or more and more preferably 5 μm or more.

Here, the average particle size means an average value of measurement values of particle sizes (lengths of major axes) of several tens of particles in observation using an electron microscope of SEM or TEM.

Then, in the present description, the NCM-based composite oxide secondary particle (A) comprises primary particles alone to form the secondary particle, and comprises no lithium-based polyanion particle (B) nor other components such as carbon (c1) derived from cellulose nanofibers and carbon (c2) derived from water-soluble carbon materials.

In the case where the Li-NCM-based composite oxide particles represented by the above formula (I) form the core-shell structure in the Li-NCM-based composite oxide secondary particle (A), the average particle size as primary particles forming the core portion is preferably 50 nm to 500 nm and more preferably 50 nm to 300 nm. Then the average particle size of the core portion formed by aggregation of the primary particles is preferably 1 μm to 25 μm and more preferably 1 μm to 20 μm.

Then the average particle size as primary particles of the Li-NCM-based composite oxide particles constituting the shell portion covering the surface of such a core portion is preferably 50 nm to 500 nm and more preferably 50 nm to 300 nm; and the layer thickness of the shell portion formed by aggregation of such primary particles is preferably 0.1 μm to 5 μm and more preferably 0.1 μm to 2.5 μm.

The internal voidage of the secondary particle (A) composed of the NCM-based composite oxide represented by the above formula (I) is, from the viewpoint that expansion of the NCM-based composite oxide along with intercalation of lithium ions is made to be allowed in internal voids of the secondary particle, preferably 4 to 12 volume % and more preferably 5 to 10 volume %, in 100 volume % of the secondary particle of the NCM-based composite oxide.

Then, the NCA-based composite oxide represented by the formula (II) will be described.

$M^2$ in the above formula (II) denotes one or more elements selected from the group consisting of Mg, Ti, Nb, Fe, Cr, Si, Ga, V, Zn, Cu, Sr, Mo, Zr, Sn, Ta, W, La, Ce, Pb, Bi and Ge.

Then d, e, f and y in the above formula (II) are numbers satisfying $0.4 \leq d < 1$, $0 < e \leq 0.6$, $0 < f \leq 0.3$, $0 \leq y \leq 0.3$ and $3d+3e+3f+(a\ valence\ of\ M^2) \times y = 3$.

The NCA-based composite oxide represented by the above formula (II) is superior further in the battery capacity and the output characteristic to the NCM-based composite oxide represented by the above formula (I).

Additionally, the NCA-based composite oxide hardly causes deterioration by moisture in the atmosphere due to the incorporation of Al, and is excellent also in the safety.

Specific examples of the NCA-based composite oxide represented by the above formula (II) include $LiNi_{0.33}Co_{0.33}Al_{0.34}O_2$, $LiNi_{0.8}Co_{0.1}Al_{0.1}O_2$, $LiNi_{0.8}Co_{0.15}Al_{0.03}Mg_{0.03}O_2$ and $LiNi_{0.6}Co_{0.15}Al_{0.03}Zn_{0.03}O_2$. Among these, $LiNi_{0.8}Co_{0.15}Al_{0.03}Mg_{0.03}O_2$ is preferable.

Further the Li-NCA-based composite oxide particle represented by the above formula (II) may be covered with a metal oxide, a metal fluoride or a metal phosphate salt. By covering the Li-NCA-based composite oxide particle with the metal oxide, the metal fluoride or the metal phosphate salt, there can be suppressed dissolving-out of a metal component (Ni, Al, Co or an $M^2$) from the Li-NCA-based composite oxide particle into an electrolyte solution. As such a covering material, there can be used one or more selected from the group consisting of $CeO_2$, $SiO_2$, $MgO$, $Al_2O_3$, $ZrO_2$, $TiO_2$, $ZnO$, $RuO_2$, $SnO_2$, $CoO$, $Nb_2O_5$, $CuO$, $V_2O_5$, $MoO_3$, $La_2O_3$, $WO_3$, $AlF_3$, $NiF_2$, $MgF_2$, $Li_3PO_4$, $Li_4P_2O_7$, $LiPO_3$, $Li_2PO_3F$ and $LiPO_2F_2$, or a composited material thereof.

The average particle size of primary particles of the NCA-based composite oxide represented by the above formula (II), the average particle size of the NCA-based composite oxide secondary particles (A) formed by aggregation of the primary particles, and the internal voidage of such secondary particles are similar to the above case of the NCM-based composite oxide. That is, the average particle size of primary particles of the NCA-based composite oxide represented by the above formula (II) is preferably 500 nm or less and more preferably 300 nm or less; and the average particle size of the NCA-based composite oxide secondary particles (A) composed of the primary particles is preferably 25 μm or less and more preferably 20 μm or less. Further the internal voidage of the NCA-based composite oxide secondary particle (A) composed of the NCA-based composite oxide represented by the above formula (II) is preferably 4 to 12 volume % and more preferably 5 to 10 volume %, in 100 volume % of such a secondary particle.

The lithium transition metal oxide secondary particle (A) according to the present invention may have the NCM-based composite oxide represented by the above formula (I) and the NCA-based composite oxide represented by the above formula (II) mixed with each other. The mixing state may be a state in which primary particles of the NCM-based composite oxide represented by the above formula (I) and primary particles of the NCA-based composite oxide represented by the above formula (II) coexist and form the secondary particle, a state in which there are mixed secondary particles composed of the NCM-based composite oxide alone represented by the above formula (I) and secondary particles composed of the NCA-based composite oxide alone represented by the above formula (II), or a state in which there are mixed secondary particles made by coexistence of primary particles of the NCM-based composite oxide represented by the above formula (I) and primary particles of the NCA-based composite oxide represented by the above formula (II), secondary particles composed of the NCM-based composite oxide alone represented by the above formula (I) and secondary particles composed of the NCA-based composite oxide alone represented by the above formula (II). Further in the case of the secondary particle composed of the NCM-based composite oxide particles alone represented by the above formula (I), the secondary particle may be one in which the NCM-based composite oxide particles having two or more mutually different compositions form a core-shell structure.

In the case where the NCM-based composite oxide represented by the above formula (I) and the NCA-based composite oxide represented by the above formula (II) are mixed, the proportion (mass %) of the NCM-based composite oxide and the NCA-based composite oxide may suitably be regulated according to required battery characteristics. For example, in the case of giving importance to the rate characteristic, it is preferable to make high the proportion of the NCM-based composite oxide represented by the above formula (I); and specifically, it is preferable that the mass proportion (NCM-based composite oxide:NCA-based composite oxide) of the NCM-based composite oxide and the NCA-based composite oxide be 99.9:0.1 to 60:40. Then for example, in the case of giving importance to the battery capacity, it is preferable to make high the proportion of the NCA-based composite oxide represented by the above formula (II); and, specifically, it is preferable that the mass proportion (NCM-based composite oxide:NCA-based composite oxide) of the NCM-based composite oxide and the NCA-based composite oxide be 40:60 to 0.1:99.9.

Since on the surface of the secondary particle (A) composed of the NCM-based composite oxide represented by the above formula (I) and/or the NCA-based composite oxide represented by the above formula (II), the NCM-based composite oxide particles and the lithium-based polyanion particles (B), or the NCA-based composite oxide particles and the lithium-based polyanion particles (B) are composited so as to cover the surface of the secondary particle, there can be suppressed dissolving-out of metal elements contained in the NCM-based composite oxide particles or the NCA-based composite oxide particles.

Then, the above lithium-based polyanion particles (B) will be described. Such lithium-based polyanion particles (B) are represented by the above formula (III) or (III)'; although the former is particles containing Li whereas the latter is particles containing no Li, the both have an olivine structure. Hence, in the present invention, since the lithium-based polyanion particles (B) represented by the formula (III)' have properties very near those of the lithium-based polyanion particles (B) represented by the formula (III), and the both exhibit the similar effect, these particles including the particles represented by the formula (III)' will be generically called "lithium-based polyanion particles (B)".

In either of the above formulae (III) and (III)', $M^3$ denotes Co, Ni, Ca, Sr, Y, Zr, Mo, Ba, Pb, Bi, La, Ce, Nd or Gd.

Then, g, h, i and z in the above formula (III) denote numbers satisfying $0<g\leq1.2$, $0\leq h\leq1.2$, $0\leq i\leq1.2$, $0\leq z\leq0.3$ and $h+i\neq0$, and g+(a valence of Mn)×h+(a valence of Fe)×i+(a valence of $M^3$)×z=3.

Further, h', i' and z' in the above formula (III)' denote numbers satisfying $0\leq h'\leq1.2$, $0\leq i'\leq1.2$, $0\leq z'\leq0.3$ and $h'+i'\neq0$, and (a valence of Mn)×h'+(a valence of Fe)×i'+(a valence of $M^3$)×z'=3.

In the lithium-based polyanion particle (B) represented by the above formula (III), from the viewpoint of the average discharge voltage of the positive electrode active material composite for a lithium-ion secondary battery, $0.5\leq g\leq1.2$ is preferable; $0.6\leq g\leq1.1$ is more preferable; and $0.65\leq g\leq1.05$ is still more preferable. Then, in the lithium-based polyanion particle (B) represented by the above formula (III)', from the similar viewpoint, $0.5\leq h\leq1.2$ is preferable; $0.6\leq h\leq1.1$ is more preferable; and $0.65\leq h\leq1.05$ is still more preferable. Then, in the lithium-based polyanion particle (B) represented by the above formula (III)', from the similar viewpoint, $0.5\leq h'\leq1.2$ is preferable; and $0.6\leq h'\leq1.1$ is more preferable.

Specific examples of the lithium-based polyanion particles (B) include $LiMnPO_4$, $LiMn_{0.9}Fe_{0.1}PO_4$, $LiMn_{0.8}Fe_{0.2}PO_4$, $LiMn_{0.75}Fe_{0.15}Mg_{0.1}PO_4$, $LiMn_{0.75}Fe_{0.19}Zr_{0.03}PO_4$, $LiMn_{0.7}Fe_{0.3}PO_4$, $LiMn_{0.6}Fe_{0.4}PO_4$, $LiMn_{0.5}Fe_{0.5}PO_4$, $Li_{1.2}Mn_{0.63}Fe_{0.27}PO_4$, $Li_{0.6}Mn_{0.84}Fe_{0.36}PO_4$, and $Mn_{0.7}Fe_{0.3}PO_4$; and among these, preferable is $LiMn_{0.8}Fe_{0.2}PO_4$, $Li_{1.2}Mn_{0.63}Fe_{0.27}PO_4$, $Li_{0.6}Mn_{0.84}Fe_{0.36}PO_4$, or $Mn_{0.7}Fe_{0.3}PO_4$.

Further, the lithium-based polyanion particles represented by the above formula (III) or (III)' and having two or more mutually different compositions may form lithium-based polyanion particles (B) of a core-shell structure having a core portion (inner portion) and a shell portion (surface layer portion).

By making the lithium-based polyanion particles (B) to form the core-shell structure, since it becomes possible that a lithium-based polyanion having a high content of Mn, which would be liable to dissolve out from the lithium-based polyanion particles (B) into an electrolyte solution, is disposed in the core portion and a lithium-based polyanion having a low content of Mn is disposed in the shell portion contacting with the electrolyte solution, or a lithium-based polyanion having a high content of Co, which is strong in toxicity to human bodies and the environment, is disposed in the core portion and a lithium-based polyanion having a low content of Co is disposed in the shell portion contacting with the electrolyte solution, there can be more improved the suppression of reduction of the cycle characteristic caused by the lithium-based polyanion particles, and the securing of the safety. At this time, the core portion may be constituted of one phase, or of two or more phases having different compositions. A form constituting the core portion of two or more phases may be a structure in which a plurality of phases concentrically make layers and are laminated, or a structure in which the composition transitionally varies from the surface of the core portion toward the central portion.

Further, the shell portion suffices if being formed outside the core portion, and may be of one phase, or may be constituted of two or more phases having different compositions, as in the core portion.

Specific examples of the lithium-based polyanion particles (B) having such a core-shell structure include particles composed, as (core portion)-(shell portion), of $(LiMnPO_4)$-$(LiFePO_4)$, $(LiCoPO_4)$-$(LiNiPO_4)$, $(LiMnPO_4)$-$(LiNiPO_4)$, $(LiCoPO_4)$-$(LiFePO_4)$ and $(LiMn_{0.5}Co_{0.5}PO_4)$-$(LiFePO_4)$.

The average particle size of the lithium-based polyanion particles (B) represented by the above formula (III) or (III)' is, from the viewpoint of being densely composited with the lithium transition metal oxide particles on the surface of the lithium transition metal oxide secondary particle (A), 50 to 200 nm and preferably 70 to 150 nm.

The electric conductivity at 25° C. under a pressure of 20 MPa of the lithium-based polyanion particles (B) represented by the above formula (III) or (III)' is preferably $1 \times 10^{-7}$ S/cm or more and more preferably $1 \times 10^{-6}$ S/cm or more. The lower limit value of the electric conductivity of the lithium-based polyanion particles (B) is not especially limited.

The above lithium-based polyanion particles (B) are made by supporting carbon (c) on their surface. The amount of such carbon (c) carried is, in 100 mass % of the total amount of the lithium-based polyanion particles (B) supporting carbon (c), 0.1 mass % or more and lower than 18 mass %, preferably 1 to 11 mass % and more preferably 1 to 8 mass %.

The mass ratio of the content of the lithium transition metal oxide secondary particles (A) to the content of the lithium-based polyanion particles (B) supporting carbon (c) on their surface (including the amount of carbon (c) carried), ((A):(B)), is preferably 95:5 to 65:35 and more preferably 90:10 to 70:30.

Then as the carbon (c) supported on the surface of the lithium-based polyanion particle (B) represented by the above formula (III) or (III)', preferable is carbon (c1) derived from cellulose nanofibers or carbon (c2) derived from water-soluble carbon materials described below. Here, in this case, the amount of the carbon (c) carried in the lithium-based polyanion particle (B) is the total amount of carbon carried of the carbon (c1) derived from cellulose nanofibers and the carbon (c2) derived from water-soluble carbon materials, and is equivalent to an amount in terms of carbon atom of the cellulose nanofibers or water-soluble carbon materials as the above carbon source.

The cellulose nanofibers supported on the surface of the lithium-based polyanion particle (B) and becoming the carbon source (c1) are a skeleton component occupying 50% of every plant cell wall, and are light-weight high-strength fibers which can be obtained by defibrating or otherwise plant fibers constituting such cell walls into nanosizes; and carbon derived from the cellulose nanofibers have a periodic structure. Such cellulose nanofibers have a fiber diameter of 1 nm to 100 nm, and also have dispersibility good to water. Further since cellulose molecular chains constituting the cellulose nanofibers have a periodic structure formed by carbon, the cellulose nanofibers while being carbonized are carried firmly on the surface of the lithium-based polyanion particles (B) conjointly with the polyanion particles, thereby imparting electron conductivity to the polyanion particles, whereby there can be provided a positive electrode active material composite for a lithium-ion secondary battery excellent in the cycle characteristic and useful.

The water-soluble carbon material as the above carbon source (c2) supported on the surface of the lithium-based polyanion particles (B) means a carbon material, 0.4 g or more, preferably 1.0 g or more of which in terms of carbon atom of the water-soluble carbon material dissolves in 100 g of water at 25° C., and is carbonized and results in being present as carbon on the surface of the lithium-based polyanion particles (B). Examples of such water-soluble carbon materials include one or more selected from the group consisting of saccharides, polyols, polyethers and organic acids. More specific examples thereof include monosaccharides such as glucose, fructose, galactose and mannose; disaccharides such as maltose, sucrose and cellobiose; polysaccharides such as starch and dextrin; polyols and polyethers such as ethylene glycol, propylene glycol, diethylene glycol, polyethylene glycols, butanediol, propanediol, polyvinyl alcohols and glycerol; and organic acids such as citric acid, tartaric acid and ascorbic acid. Among these, from the viewpoint of enhancing the dissolvability and dispersibility to solvents and making the carbon materials to effectively function, preferable are glucose, fructose, sucrose and dextrin; and more preferable is glucose.

Here, the amount of the carbon (c) (in the case where the carbon (c) is the carbon (c1) derived from cellulose nanofibers or the carbon (c2) derived from water-soluble carbon materials, the amount is in terms of carbon atom thereof) supported on the surface of the lithium-based polyanion particles (B) can be checked as an amount of carbon measured for the lithium-based polyanion particles (B) by using a carbon and sulfur analyzer.

The lithium-based polyanion particles (B) represented by the above formula (III) or (III)' according to the present invention may be composited with primary particles of the lithium transition metal oxide, or may be composited directly with part of the lithium transition metal oxide secondary particles (A) made by aggregation of primary particles of the lithium transition metal oxide.

A method for producing the positive electrode active material composite for a lithium-ion secondary battery according to the present invention suffices if comprising a step of mixing and compositing the lithium transition metal oxide secondary particles (A) with the lithium-based polyanion particles (B) supporting carbon (c) while adding a compressive force and a shearing force.

It is preferable that the process of mixing while adding a compressive force and a shearing force be carried out in a hermetically sealed vessel equipped with an impeller. The process time and/or the peripheral velocity of the impeller when the process of mixing under addition of a compressive force and a shearing force is carried out needs to be regulated suitably according to the total amount of the lithium transition metal oxide secondary particles (A) and the lithium-based polyanion particles (B) to be charged in the vessel.

For example, in the case of carrying out the process of mixing while adding a compressive force and a shearing force in the hermetically sealed vessel equipped with an impeller rotating at a peripheral velocity of 15 to 45 m/s for 5 to 90 min, the total amount of the lithium transition metal oxide secondary particles (A) and the lithium-based polyanion particles (B) to be charged in the vessel is, per 1 cm³ of an effective vessel (a vessel corresponding to a site which can accommodate a mixing object in the hermetically sealed vessel equipped with an impeller), preferably 0.1 to 0.7 g and more preferably 0.15 to 0.4 g.

The peripheral velocity of such an impeller is, from the viewpoint of raising the tap density of the positive electrode active material composite for a lithium-ion secondary battery to be obtained, preferably 15 to 45 m/s and more preferably 15 to 35 m/s. Then the mixing time is preferably 5 to 90 min and more preferably 10 to 80 min.

Here, the peripheral velocity of the impeller means a velocity of the outermost end of a rotary stirring blade (impeller) and can be represented by the following expression (1); and the time during which the process of mixing is carried out under addition of a compressive force and a shearing force may be varied also according to the peripheral velocity of the impeller like the time is made longer at a lower peripheral velocity of the impeller.

$$\text{Peripheral velocity of an impeller(m/s)} = \text{a radius of the impeller(m)} \times 2 \times \pi \times \text{a rotation frequency(rpm)}/60 \quad (1)$$

An apparatus having such a hermetically sealed vessel which can easily carry out a compositing process under addition of a compressive force and a shearing force includes high-speed shearing mills and blade-type kneaders; and there can suitably be used, specifically for example, a particle designing apparatus COMPOSI, a Mechano Hybrid and a high-performance fluid-type mixer FM mixer (manufactured by Nippon Coke & Engineering Co., Ltd.), a fine particle compositing apparatus, Mechano Fusion Nobilta (manufactured by Hosokawa Micron Corp.), and a surface-modifying apparatus Miralo and a hybridization system (manufactured by Nara Machinery Co., Ltd.).

The processing condition of the above mixing is: the processing temperature is preferably 5 to 80° C. and more preferably 10 to 50° C.; and the processing atmosphere is not especially limited, but preferably an inert gas atmosphere or a reducing gas atmosphere.

The degree of compact and uniform dispersing and compositing of the above lithium-based polyanion particles (B) on the surface of the lithium transition metal oxide secondary particle (A) by the compositing process while adding a compressive force and a shearing force can be evaluated by X-ray photoelectron spectroscopy (XPS). Specifically, since when an obtained positive electrode active material composite for a lithium-ion secondary battery is irradiated with soft X-rays of a few keV, photoelectrons having energy values characteristic of elements constituting sites irradiated with such soft X-rays are emitted from the sites, by comparing a peak intensity of $Ni2p_{3/2}$ emitted from lithium transition metal oxide secondary particles (A) with peak intensities of P2p and C1s emitted from lithium-based polyanion particles (B), there can be found the areal ratio of a material making the surface of the positive electrode active material composite for a lithium-ion secondary battery, that is, the degree of covering of the lithium transition metal oxide secondary particles (A) with such lithium-based polyanion particles (B). Since the lithium-based polyanion particles (B) contain trivalent Ni in some cases, however, as the peak intensity of $Ni2p_{3/2}$, there is used a peak intensity of $Ni2p_{3/2}$ of the lithium transition metal oxide secondary particles (A) in a differential XPS profile, in which the peak intensity of $Ni2p_{3/2}$ is acquired by subtracting a peak of $Ni2p_{3/2}$ derived from the lithium-based polyanion particles (B) normalized with respect to the peak of P2p of the lithium transition metal oxide secondary particles (A) from the peak intensity of $Ni2p_{3/2}$ of the lithium transition metal oxide secondary particles (A). The peak intensity ratio ((the peak intensity of $Ni2p_{3/2}$)/(the peak intensity of P2p+the peak intensity of C1s)) is preferably 0.05 or less, more preferably 0.04 or less and still more preferably 0.03 or less. When the peak intensity ratio is in such a range, the surface of an obtained positive electrode active material composite for a secondary battery is such that the surface of the lithium transition metal oxide secondary particle (A) is densely covered with the lithium-based polyanion particles (B) composited with the composite oxide particles.

In the present invention, in the compositing process of the lithium transition metal oxide secondary particles (A) with the lithium-based polyanion particles (B), as a carbon source, a water-insoluble carbon powder (c3) other than the carbon (c1) derived from cellulose nanofibers may be mixed simultaneously and composited with the lithium transition metal oxide secondary particles (A) and the lithium-based polyanion particles (B). Such a water-insoluble carbon powder (c3) is a carbon material different from the carbon (c2) derived from the water-soluble carbon materials, and is a carbon powder, other than the carbon (c1) derived from cellulose nanofibers, insoluble to water (the dissolving amount to 100 g of water at 25° C. is less than 0.4 g in terms of carbon atom of the water-insoluble carbon powder (c3)) and having electric conductivity. The compositing of the water-insoluble carbon powder (c3), as the water-insoluble carbon powder (c3), without reducing the battery characteristics in the case where the positive electrode active material composite for a lithium-ion secondary battery according to the present invention is used for a secondary battery, intervenes in interstices between the lithium transition metal oxide secondary particle (A) and the lithium-based polyanion particles (B) in the positive electrode active material composite for a lithium-ion secondary battery, or is present so as to cover a plurality of the lithium-based polyanion particles (B) of the surface of the positive electrode active material composite for a lithium-ion secondary battery, can make firmer the degree of compositing of these and can effectively suppress exfoliation of the lithium-based polyanion particles (B) from the lithium transition metal oxide secondary particle (A).

The above water-insoluble carbon powder (c3) includes one or more of graphite, amorphous carbon (Ketjen black, acetylene black and the like), nanocarbon (graphene, fullerene and the like), and electrically conductive polymer powder (polyaniline powder, polyacetylene powder, polythiophene powder, polypyrrole powder and the like). Among these, from the viewpoint of strengthening the degree of compositing of the lithium transition metal oxide secondary particle (A) with the lithium-based polyanion particles (B), preferable are graphite, acetylene black, graphene and polyaniline powder; and more preferable is graphite. The graphite may be any of artificial graphite (flake, massive, earthy ones, graphene) and natural graphite.

The average particle size of the water-insoluble carbon powder (c3) is, from the viewpoint of compositing, preferably 0.5 to 20 μm and more preferably 1.0 to 15 μm.

The content of the water-insoluble carbon powder (c3), in the positive electrode active material composite for a lithium-ion secondary battery according to the preset invention, to be composited by being simultaneously mixed in compositing of the lithium transition metal oxide secondary particles (A) with the lithium-based polyanion particles (B) is, with respect to 100 parts by mass of the total amount of the lithium transition metal oxide secondary particles (A) and the lithium-based polyanion particles (B), preferably 0.0.5 to 17 parts by mass, more preferably 1 to 10 parts by mass and still more preferably 1 to 7 parts by mass.

Further, the mass ratio of the total amount of the lithium transition metal oxide secondary particles (A) and the lithium-based polyanion particles (B) supporting carbon (c) to the total content of the carbon (c) supported on the lithium-based polyanion particles (B) and the water-insoluble carbon powder (c3), (((A)+(B)):((c)+(c3))), is preferably 99.5:0.5 to 85:15, more preferably 99:1 to 90:10 and still more preferably 99:1 to 93:7.

A lithium-ion secondary battery applying and comprising, as a positive electrode active material, the positive electrode active material composite for a lithium-ion secondary battery according to the present invention is not especially limited as long as comprising, as essential constituents, a positive electrode, a negative electrode, an electrolyte solution and a separator, or a positive electrode, a negative electrode and a solid electrolyte.

Here, the negative electrode is not especially limited in its material constitution as long as being capable of occluding lithium ions in the charge time and releasing them in the discharge time, and a well-known material constitution can be used. There can be used, for example, lithium metal, graphite, a silicon series (Si, $SiO_x$), lithium titanate or a carbon material such as amorphous carbon. Then it is preferable to use an electrode formed of an intercalating material capable of electrochemically occluding and releasing lithium ions, especially a carbon material. Further, concurrent use of two or more of the above negative electrode materials is allowed and for example, a combination of graphite and a silicon series can be used.

The electrolyte solution is a solution in which a supporting salt is dissolved in an organic solvent. The organic solvent is not especially limited as long as being one to be usually used for electrolyte solutions of lithium-ion secondary batteries, and there can be used, for example, carbonates, hydrocarbon halides, ethers, ketones, nitriles, lactones and oxolane compounds.

The supporting salt is not especially limited in its kind, but preferable is at least one of inorganic salts selected from the group consisting of $LiPF_6$, $LiBF_4$, $LiClO_4$ and $LiAsF_6$, and derivatives of the inorganic salts, and organic salts selected from the group consisting of $LiSO_3CF_3$, $LiC(SO_3CF_3)_2$, $LiN(SO_3CF_3)_2$, $LiN(SO_2C_2F_5)_2$ and $LiN(SO_2CF_3)(SO_2C_4F_9)$, and derivatives of the organic salts.

The separator is to electrically insulate the positive electrode and the negative electrode and serve to hold the electrolyte solution. There may be used, for example, a porous synthetic resin membrane, particularly a porous membrane of a polyolefin-based polymer (polyethylene, polypropylene).

The solid electrolyte is to electrically insulate the positive electrode and the negative electrode and exhibit a high lithium ion conductivity. There may be used, for example, $La_{0.51}Li_{0.34}TiO_{2.94}$, $Li_{1.3}Al_{0.3}Ti_{1.7}(PO_4)_3$, $Li_7La_3Zr_2O_{12}$, $50Li_4SiO_4 \cdot 50Li_3BO_3$, $Li_{2.9}PO_{3.3}N_{0.46}$, $Li_{3.6}Si_{0.6}P_{0.4}O_4$, $Li_{1.07}Al_{0.69}Ti_{1.46}(PO_4)_3$, $Li_{1.5}Al_{0.5}Ge_{1.5}(PO_4)_3$, $Li_{10}GeP_2S_{12}$, $Li_{3.25}Ge_{0.25}P_{0.75}S_4$, $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, $50Li_2S \cdot 50GeS_2$, $Li_7P_3S_{11}$ or $Li_{3.25}P_{0.95}S_4$.

The shape of the lithium-ion secondary battery having the above constitution is not especially limited, and may be one of various shapes such as coin, cylindrical and rectangular ones or an indeterminate shape in which the constitution is enclosed in a laminate outer package.

EXAMPLES

Hereinafter, the present invention will be described specifically based on Examples, but the present invention is not any more limited to these Examples.

Production Example 1: Production of Secondary Particles (NCM-A) of an NCM-Based Composite Oxide 263 g of nickel sulfate hexahydrate, 281 g of cobalt sulfate heptahydrate, 241 g of manganese sulfate pentahydrate and 3 L of water were mixed so that the molar ratio of Ni:Co:Mn became 1:1:1. Thereafter, a 25% ammonia water was dropped in the mixed solution at a dropping rate of 300 ml/min to thereby obtain a slurry A1 having a pH of 11 and containing a metal composite hydroxide.

Then, the slurry A1 was filtered and dried to thereby obtain a mixture B1 of the metal composite hydroxide. Thereafter, 37 g of lithium carbonate was mixed in the mixture B1 by a ball mill to thereby obtain a powder mixture C1.

The obtained powder mixture C1 was calcined in the air atmosphere at 800° C. for 5 hours and disintegrated, and thereafter calcined, as a calcination, in the air atmosphere at 800° C. for 10 hours to thereby obtain secondary particles A (average particle size of the secondary particles: 10 μm) of an NCM-based composite oxide ($LiNi_{1/3}Co_{1/3}Mn_{1/3}O_2$).

Hereinafter, the secondary particles A of the NCM-based composite oxide will be referred to as NCM-A.

Production Example 2: Production of Secondary Particles (NCM-B) of an NCM-Based Composite Oxide Secondary particles B (average particle size of the secondary particles: 10 μm) of an NCM-based composite oxide ($LiNi_{1/3}Co_{1/3}Mn_{1/3}O_2$) were obtained as in Production Example 1, except for making the use amounts of nickel sulfate hexahydrate, cobalt sulfate heptahydrate and manganese sulfate pentahydrate to be 473 g, 169 g and 145 g (the molar ratio of Ni:Co:Mn=6:2:2), respectively, and mixing 22 g of lithium hydroxide in place of lithium carbonate to be mixed in the mixture of the metal composite hydroxide, in production of the NCM-based composite oxide (1) of Production Example 1.

Hereinafter, the secondary particles B of the NCM-based composite oxide will be referred to as NCM-B.

Production Example 3: Production of Secondary Particles (NCA-A) of an NCA-Based Composite Oxide 370 g of lithium carbonate, 950 g of nickel carbonate, 150 g of cobalt carbonate, 58 g of aluminum carbonate and 3 L of water were mixed so that the molar ratio of Li:Ni:Co:Al became 1:0.8:0.15:0.05, and thereafter mixed by a ball mill to thereby obtain a powder mixture A2. The obtained powder mixture A2 was calcined in the air atmosphere at 800° C. for 5 hours and disintegrated, and thereafter calcined, as a calcination, in the air atmosphere at 800° C. for 24 hours to thereby obtain secondary particles C (average particle size of the secondary particles: 10 μm) of an NCA-based composite oxide (LiNi$_{0.8}$Co$_{0.15}$Al$_{0.05}$O$_2$).

Hereinafter, the secondary particles C of the NCA-based composite oxide will be referred to as NCA-A.

Production Example 4: Production of Lithium-Based Polyanion Particles (LMP-A)

1,272 g of LiOH.H$_2$O and 4 L of water were mixed to thereby obtain a slurry A3. Then, while the obtained slurry A3 was stirred for 3 min while being held at a temperature of 25° C., 1,153 g of an 85% phosphoric acid aqueous solution was dropped at 35 mL/min; then, 5,892 g of cellulose nanofibers (Wma-10002, manufactured by Sugino Machine Ltd., fiber diameter: 4 to 20 nm) were added, and stirred at a rate of 400 rpm for 12 hours to thereby obtain a slurry B3 containing Li$_3$PO$_4$.

The obtained slurry B3 was purged with nitrogen to make the dissolved oxygen concentration of the slurry B3 to be 0.5 mg/L; thereafter, 1,688 g of MnSO$_4$.5H$_2$O and 834 g of FeSO$_4$.7H$_2$O were added to the total amount of the slurry B3 to thereby obtain a slurry C3. The molar ratio (manganese compound:iron compound) of MnSO$_4$ and FeSO$_4$ was 70:30.

Then, the obtained slurry C3 was charged in an autoclave, and subjected to a hydrothermal reaction at 170° C. for 1 hour. The pressure in the autoclave was 0.8 MPa. After the hydrothermal reaction, produced crystals were filtered, and then washed with water of 12 parts by mass to 1 part by mass of the crystals. The washed crystals were freeze-dried at −50° C. for 12 hours to thereby obtain a composite D3.

1,000 g of the obtained composite D3 was taken and 1 L of water was added thereto to thereby obtain a slurry E3. The obtained slurry E3 was subjected to a dispersing process for 1 min by an ultrasonic stirrer (T25, manufactured by IKA-Werke GmbH & Co. KG) to homogeneously color the whole, and thereafter subjected to spray drying using a spray dry machine (MLD-050M, manufactured by Fujisaki Electric Co., Ltd.) to thereby obtain granulated bodies F3.

The obtained granulated bodies F3 were calcined in an argon hydrogen atmosphere (hydrogen concentration: 3%) at 700° C. for 1 hour to thereby obtain a lithium manganese iron phosphate A (LiMn$_{0.7}$Fe$_{0.3}$PO$_4$, amount of carbon: 2.0 mass %, average particle size: 100 nm) on which 2.0 mass % of carbon derived from the cellulose nanofibers was supported.

Hereinafter, the lithium manganese iron phosphate A will be referred to as LMP-A.

Production Example 5: Production of Lithium-Based Polyanion Particles (LMP-B)

A lithium manganese iron phosphate B (LiMn$_{0.7}$Fe$_{0.3}$PO$_4$, amount of carbon: 2.0 mass %, average particle size: 100 nm) on which 2.0 mass % of carbon derived from glucose was supported was obtained as in Production Example 4, except for changing 5,892 g of the cellulose nanofibers added to the slurry A3 to 125 g of glucose in production of lithium-based polyanion particles of Production Example 4.

Hereinafter, the lithium manganese iron phosphate B will be referred to as LMP-B.

Production Example 6: Production of Lithium-Based Polyanion Particles (LMP-C)

A lithium manganese iron phosphate C (LiMn$_{0.7}$Fe$_{0.3}$PO$_4$, amount of carbon: 18.0 mass %, average particle size: 100 nm) on which 18.0 mass % of carbon derived from cellulose nanofibers was supported was obtained as in Production Example 4, except for changing 5,892 g of the cellulose nanofibers added to the slurry A3 to 53,028 g in production of lithium-based polyanion particles of Production Example 4.

Hereinafter, the lithium manganese iron phosphate C will be referred to as LMP-C.

Production Example 7: Production of Lithium-Based Polyanion Particles (LMP-D)

A lithium manganese iron phosphate D (LiMn$_{0.7}$Fe$_{0.3}$PO$_4$, amount of carbon: 12.0 mass %, average particle size: 100 nm) on which 12.0 mass % of carbon derived from cellulose nanofibers was supported was obtained as in Production Example 4, except for changing 5,892 g of the cellulose nanofibers added to the slurry A3 to 35,352 g in production of lithium-based polyanion particles of Production Example 4.

Hereinafter, the lithium manganese iron phosphate D will be referred to as LMP-D.

Production Example 8: Production of Lithium-Based Polyanion Particles (LMP-E)

A lithium manganese iron phosphate E (LiMn$_{0.7}$Fe$_{0.3}$PO$_4$, amount of carbon: 1.0 mass %, average particle size: 100 nm) on which 1.0 mass % of carbon derived from cellulose nanofibers was supported was obtained as in Production Example 4, except for changing 5,892 g of the cellulose nanofibers added to the slurry A3 to 2,946 g in production of lithium-based polyanion particles of Production Example 4.

Hereinafter, the lithium manganese iron phosphate E will be referred to as LMP-E.

Production Example 9: Production of Lithium-Based Polyanion Particles (LMP-F)

A lithium manganese iron phosphate F (LiMn$_{0.7}$Fe$_{0.3}$PO$_4$, amount of carbon: 0.1 mass %, average particle size: 100 nm) on which 0.1 mass % of carbon derived from cellulose nanofibers was supported was obtained as in Production Example 4, except for changing 5,892 g of the cellulose nanofibers added to the slurry A3 to 294 g in production of lithium-based polyanion particles of Production Example 4.

Hereinafter, the lithium manganese iron phosphate F will be referred to as LMP-F.

Production Example 10: Production of Lithium-Based Polyanion Particles (LMP-G)

A lithium manganese iron phosphate G (LiMn$_{0.7}$Fe$_{0.3}$PO$_4$, amount of carbon: 0.05 mass %, average particle size: 100 nm) on which 0.05 mass % of carbon derived from cellulose nanofibers was supported was obtained as in Production Example 4, except for changing 5,892 g of the cellulose nanofibers added to the slurry A3 to 147 g in production of lithium-based polyanion particles of Production Example 4.

Hereinafter, the lithium manganese iron phosphate G will be referred to as LMP-G.

Production Example 11: Production of Lithium-Based Polyanion Particles (LMP-H)

A lithium manganese iron phosphate H (LiMn$_{0.7}$Fe$_{0.3}$PO$_4$, amount of carbon: 2.0 mass %, average particle size: 500 nm) on which 2.0 mass % of carbon derived from cellulose nanofibers was supported was obtained as in Production Example 4, except for changing 170° C.×1 hour of the hydrothermal reaction of the slurry C3 to 200° C.×48 hours in production of lithium-based polyanion particles of Production Example 4.

Hereinafter, the lithium manganese iron phosphate H will be referred to as LMP-H.

Production Example 12: Production of Lithium-Based Polyanion Particles (LMP-I)

A lithium manganese iron phosphate I ($LiMn_{0.7}Fe_{0.3}PO_4$, amount of carbon: 2.0 mass %, average particle size: 150 nm) on which 2.0 mass % of carbon derived from cellulose nanofibers was supported was obtained as in Production Example 4, except for changing 170° C.×1 hour of the hydrothermal reaction of the slurry C3 to 200° C.×3 hours in production of lithium-based polyanion particles of Production Example 4.

Hereinafter, the lithium manganese iron phosphate I will be referred to as LMP-I.

Production Example 13: Production of Lithium-Based Polyanion Particles (LMP-J)

A lithium manganese iron phosphate J ($LiMn_{0.7}Fe_{0.3}PO_4$, amount of carbon: 2.0 mass %, average particle size: 70 nm) on which 2.0 mass % of carbon derived from cellulose nanofibers was supported was obtained as in Production Example 4, except for changing 170° C.×1 hour of the hydrothermal reaction of the slurry C3 to 140° C.×1 hour in production of lithium-based polyanion particles of Production Example 4.

Hereinafter, the lithium manganese iron phosphate J will be referred to as LMP-J.

Production Example 14: Production of Lithium-Based Polyanion Particles (LMP-K)

A lithium manganese iron phosphate K ($LiMn_{0.7}Fe_{0.3}PO_4$, amount of carbon: 2.0 mass %, average particle size: 10 nm) on which 2.0 mass % of carbon derived from cellulose nanofibers was supported was obtained as in Production Example 4, except for changing 170° C.×1 hour of the hydrothermal reaction of the slurry C3 to 140° C.×10 min in production of lithium-based polyanion particles of Production Example 4.

Hereinafter, the lithium manganese iron phosphate K will be referred to as LMP-K.

Production Example 15: Production of Lithium-Based Polyanion Particles (LMP-L)

A lithium manganese iron phosphate L ($LiMn_{0.7}Fe_{0.3}PO_4$, amount of carbon: 0.0 mass %, average particle size: 10 nm) on which carbon was not supported was obtained as in Production Example 4, except for adding no cellulose nanofibers to the slurry A3 in production of lithium-based polyanion particles of Production Example 4.

Hereinafter, the lithium manganese iron phosphate L will be referred to as LMP-L.

Example 1: (NCM-A70%+LMP-A30%) Composite a1

350 g of NCM-A obtained in Production Example 1 and 150 g of LMP-A obtained in Production Example 4 were subjected to a compositing process at 20 m/s (2,600 rpm) for 10 min by using a Mechano Fusion (manufactured by Hosokawa Micron Corp., AMS-Lab) to thereby obtain a positive electrode active material composite a1 for a lithium-ion secondary battery, in which NCM was composited with LMP-A.

Example 2: (NCM-A70%+LMP-$B_{30}$%) Composite b1

A positive electrode active material composite b1 for a lithium-ion secondary battery was obtained as in Example 1, except for changing LMP-A to LMP-B obtained in Production Example 5.

Example 3: (NCM-A90%+LMP-A10%) Composite c1

A positive electrode active material composite c1 for a lithium-ion secondary battery was obtained as in Example 1, except for changing the amount of NCM-A to 450 g and the amount of LMP-A to 50 g.

Example 4: (NCM-A90%+LMP-D10%) Composite d1

A positive electrode active material composite d1 for a lithium-ion secondary battery was obtained as in Example 1, except for changing the amount of NCM-A to 450 g, changing LMP-A to LMP-D obtained in Production Example 7, and making the amount for the compositing process of the LMP-D to be 50 g.

Example 5: (NCM-A80%+LMP-A20%) Composite e1

A positive electrode active material composite e1 for a lithium-ion secondary battery was obtained as in Example 1, except for changing the amount of NCM-A to 400 g and the amount of LMP-A to 100 g.

Example 6: (NCM-A70%+LMP-E30%) Composite f1

A positive electrode active material composite f1 for a lithium-ion secondary battery was obtained as in Example 1, except for changing LMP-A to LMP-E obtained in Production Example 8.

Example 7: (NCM-A70%+LMP-I30%) Composite g1

A positive electrode active material composite g1 for a lithium-ion secondary battery was obtained as in Example 1, except for changing LMP-A to LMP-I obtained in Production Example 12.

Example 8: (NCM-A70%+LMP-J30%) Composite h1

A positive electrode active material composite h1 for a lithium-ion secondary battery was obtained as in Example 1, except for changing LMP-A to LMP-J obtained in Production Example 13.

Example 9: (NCM-A70%+LMP-F$_{30}$%) Composite i1

A positive electrode active material composite i1 for a lithium-ion secondary battery was obtained as in Example 1, except for changing LMP-A to LMP-F obtained in Production Example 9.

Example 10: (NCM-A70%+LMP-F$_{30}$%)$_{99}$%+ Graphite1% Composite j1

A positive electrode active material composite j1 for a lithium-ion secondary battery was obtained as in Example 1, except for changing LMP-A to LMP-F obtained in Production Example 9, and for the compositing process, further adding 5 g of a graphite (manufactured by Nippon Graphite Industries, Ltd., CGB10, average particle size: 10 μm).

Example 11: (NCM-A70%+LMP-F30%)90%+Graphite10% Composite k1

A positive electrode active material composite k1 for a lithium-ion secondary battery was obtained as in Example 1, except for changing LMP-A to LMP-F obtained in Production Example 9, and for the compositing process, further adding 55 g of a graphite (manufactured by Nippon Graphite Industries, Ltd., CGB10, average particle size: 10 μm).

Example 12: (NCM-A70%+LMP-F30%)99%+Graphene1% Composite l1

A positive electrode active material composite l1 for a lithium-ion secondary battery was obtained as in Example 1, except for changing LMP-A to LMP-F obtained in Production Example 9, and for the compositing process, further adding 5 g of a graphene (manufactured by XG Sciences, Inc., xGNP, average particle size: 30 μm).

Example 13: (NCM-A70%+LMP-F30%)99%+Acetylene Black1% Composite m1

A positive electrode active material composite m1 for a lithium-ion secondary battery was obtained as in Example 1, except for changing LMP-A to LMP-F obtained in Production Example 9, and for the compositing process, further adding 5 g of an acetylene black (manufactured by Denka Corp., LI-100, average particle size: 50 nm).

Example 14: (NCM-A70%+LMP-F30%)99%+Polyaniline1% Composite n1

A positive electrode active material composite n1 for a lithium-ion secondary battery was obtained as in Example 1, except for changing LMP-A to LMP-F obtained in Production Example 9, and for the compositing process, further adding 5 g of a polyaniline (manufactured by Shigma-Aldrich Corp.).

Example 15: (NCM-B70%+LMP-A30%) Composite o1

A positive electrode active material composite o1 for a lithium-ion secondary battery was obtained as in Example 1, except for changing NCM-A to NCM-B obtained in Production Example 2.

Example 16: (NCA-A70%+LMP-A30%) Composite a2

350 g of NCA-A obtained in Production Example 3 and 150 g of LMP-A obtained in Production Example 4 were subjected to a compositing process at 20 m/s (2,600 rpm) for 10 min by using a Mechano Fusion (manufactured by Hosokawa Micron Corp., AMS-Lab) to thereby obtain a positive electrode active material composite a2 for a lithium-ion secondary battery, in which NCA was composited with LMP-A.

Example 17: (NCA-A70%+LMP-B$_{30}$%) Composite b2

A positive electrode active material composite b2 for a lithium-ion secondary battery was obtained as in Example 16, except for changing LMP-A to LMP-B obtained in Production Example 5.

Example 18: (NCA-A90%+LMP-A10%) Composite c2

A positive electrode active material composite c2 for a lithium-ion secondary battery was obtained as in Example 16, except for changing the amount of NCA-A to 450 g and the amount of LMP-A to 50 g.

Example 19: (NCA-A90%+LMP-D10%) Composite d2

A positive electrode active material composite d2 for a lithium-ion secondary battery was obtained as in Example 16, except for changing the amount of NCA-A to 450 g, changing LMP-A to LMP-D obtained in Production Example 7, and making the amount for the compositing process of the LMP-D to be 50 g.

Example 20: (NCA-A80%+LMP-A20%) Composite e2

A positive electrode active material composite e2 for a lithium-ion secondary battery was obtained as in Example 16, except for changing the amount of NCA-A to 400 g and the amount of LMP-A to 100 g.

Example 21: (NCA-A70%+LMP-E30%) Composite f2

A positive electrode active material composite f2 for a lithium-ion secondary battery was obtained as in Example 16, except for changing LMP-A to LMP-E obtained in Production Example 8.

Example 22: (NCA-A70%+LMP-I30%) Composite g2

A positive electrode active material composite g2 for a lithium-ion secondary battery was obtained as in Example 16, except for changing LMP-A to LMP-I obtained in Production Example 12.

Example 23: (NCA-A70%+LMP-J30%) Composite h2

A positive electrode active material composite h2 for a lithium-ion secondary battery was obtained as in Example 16, except for changing LMP-A to LMP-J obtained in Production Example 13.

Example 24: (NCA-A70%+LMP-F30%) Composite i2

A positive electrode active material composite i2 for a lithium-ion secondary battery was obtained as in Example 16, except for changing LMP-A to LMP-F obtained in Production Example 9.

Example 25: (NCA-A70%+LMP-F30%)99%+Graphite1% Composite j2

A positive electrode active material composite j2 for a lithium-ion secondary battery was obtained as in Example 16, except for changing LMP-A to LMP-F obtained in Production Example 9, and for the compositing process, further adding 5 g of a graphite (manufactured by Nippon Graphite Industries, Ltd., CGB10, average particle size: 10 µm).

Example 26: (NCA-A70%+LMP-F30%)90%+Graphite10% Composite k2

A positive electrode active material composite k2 for a lithium-ion secondary battery was obtained as in Example 16, except for changing LMP-A to LMP-F obtained in Production Example 9, and for the compositing process, further adding 55 g of a graphite (manufactured by Nippon Graphite Industries, Ltd., CGB10, average particle size: 10 µm).

Example 27: (NCA-A70%+LMP-F30%)99%+Graphene1% Composite l2

A positive electrode active material composite l2 for a lithium-ion secondary battery was obtained as in Example 16, except for changing LMP-A to LMP-F obtained in Production Example 9, and for the compositing process, further adding 5 g of a graphene (manufactured by XG Sciences, Inc., xGNP, average particle size: 30 m).

Example 28: (NCA-A70%+LMP-F30%)99%+Acetylene Black1% Composite m2

A positive electrode active material composite m2 for a lithium-ion secondary battery was obtained as in Example 16, except for changing LMP-A to LMP-F obtained in Production Example 9, and for the compositing process, further adding 5 g of an acetylene black (manufactured by Denka Corp., LI-100, average particle size: 50 nm).

Example 29: (NCA-A70%+LMP-F30%)99%+Polyaniline1% Composite n2

A positive electrode active material composite n2 for a lithium-ion secondary battery was obtained as in Example 16, except for changing LMP-A to LMP-F obtained in Production Example 9, and for the compositing process, further adding 5 g of a polyaniline (manufactured by Shigma-Aldrich Corp.).

Example 30: (NCM-A35%+NCA-A35%+LMP-A30%) Composite o2

A positive electrode active material composite o2 for a lithium-ion secondary battery was obtained as in Example 1, except for changing 350 g of LMP-A to the mixture of 175 g of LMP-A and 175 g of NCA-A obtained in Production Example 3.

Comparative Example 1: (NCM-A70%+LMP-A30%) Mixture p1

350 g of NCM-A obtained in Production Example 1 and 150 g of LMP-A obtained in Production Example 4 were subjected to a mixing process for 5 min by using a mortar to thereby obtain a positive electrode active material mixture p1 for a lithium-ion secondary battery, in which NCM-A was simply mixed with LMP-A without NCM-A and LMP-A being composited.

Comparative Example 2: (NCM-A70%+LMP-L30%) Composite q1

A positive electrode active material composite q1 for a lithium-ion secondary battery was obtained as in Example 1, except for changing LMP-A to LMP-L obtained in Production Example 15.

Comparative Example 3: (NCM-A99.5%+LMP-A0.5%) Composite r1

A positive electrode active material composite r1 for a lithium-ion secondary battery was obtained as in Example 1, except for changing the amount of NCM-A to 497.5 g and the amount of LMP-A to 2.5 g.

Comparative Example 4: (NCM-A50%+LMP-A50%) Composite s1

A positive electrode active material composite s1 for a lithium-ion secondary battery was obtained as in Example 1, except for changing the amount of NCM-A to 250.0 g and the amount of LMP-A to 250.0 g.

Comparative Example 5: (NCM-A70%+LMP-G30%) Composite t1

A positive electrode active material composite t1 for a lithium-ion secondary battery was obtained as in Example 1, except for changing LMP-A to LMP-G obtained in Production Example 10.

Comparative Example 6: (NCM-A70%+LMP-C30%) Composite u1

A positive electrode active material composite u1 for a lithium-ion secondary battery was obtained as in Example 1, except for changing LMP-A to LMP-C obtained in Production Example 6.

Comparative Example 7: (NCM-A70%+LMP-K30%) Composite v1

A positive electrode active material composite v1 for a lithium-ion secondary battery was obtained as in Example 1, except for changing LMP-A to LMP-K obtained in Production Example 14.

Comparative Example 8:
(NCM-A70%+LMP-H30%) Composite w1

A positive electrode active material composite w1 for a lithium-ion secondary battery was obtained as in Example 1, except for changing LMP-A to LMP-H obtained in Production Example 11.

Comparative Example 9:
(NCM-B70%+LMP-A30%) Mixture x1

A positive electrode active material mixture x1 for a lithium-ion secondary battery was obtained as in Comparative Example 1, except for changing NCM-A to NCM-B obtained in Production Example 2.

Comparative Example 10:
(NCA-A70%+LMP-A30%) Mixture p2

350 g of NCA-A obtained in Production Example 3 and 150 g of LMP-A obtained in Production Example 4 were subjected to a mixing process for 5 min by using a mortar to thereby obtain a positive electrode active material mixture p2 for a lithium-ion secondary battery, in which NCM-A was simply mixed with LMP-A without NCM-A and LMP-A being composited.

Comparative Example 11:
(NCA-A70%+LMP-L30%) Composite q2

A positive electrode active material composite q2 for a lithium-ion secondary battery was obtained as in Example 16, except for changing LMP-A to LMP-L obtained in Production Example 15.

Comparative Example 12:
(NCA-A99.5%+LMP-A0.5%) Composite r2

A positive electrode active-material composite r2 for a lithium-ion secondary battery was obtained as in Example 16, except for changing the amount of NCA-A to 497.5 g and the amount of LMP-A to 2.5 g.

Comparative Example 13:
(NCA-A50%+LMP-A50%) Composite s2

A positive electrode active material composite s2 for a lithium-ion secondary battery was obtained as in Example 16, except for changing the amount of NCA-A to 250.0 g and the amount of LMP-A to 250.0 g.

Comparative Example 14:
(NCA-A70%+LMP-G30%) Composite t2

A positive electrode active material composite t2 for a lithium-ion secondary battery was obtained as in Example 16, except for changing LMP-A to LMP-G obtained in Production Example 10.

Comparative Example 15:
(NCA-A70%+LMP-C30%) Composite u2

A positive electrode active material composite u2 for a lithium-ion secondary battery was obtained as in Example 16, except for changing LMP-A to LMP-C obtained in Production Example 6.

Comparative Example 16:
(NCA-A70%+LMP-K30%) Composite v2

A positive electrode active material composite v2 for a lithium-ion secondary battery was obtained as in Example 16, except for changing LMP-A to LMP-K obtained in Production Example 14.

Comparative Example 17:
(NCA-A70%+LMP-H30%) Composite w2

A positive electrode active material composite w2 for a lithium-ion secondary battery was obtained as in Example 16, except for changing LMP-A to LMP-H obtained in Production Example 11.

<<Evaluation of the Degree of LMP Covering on the Composite Particle Surface by X-Ray Photoelectron Spectroscopy>>

All the positive electrode active material composites for a lithium-ion secondary battery excluding the positive electrode active material mixture p1 for a lithium-ion secondary battery, the positive electrode active material mixture x1 for a lithium-ion secondary battery and the positive electrode active material mixture p2 for a lithium-ion secondary battery obtained in Comparative Example 1, Comparative Example 9 and Comparative Example 10 were subjected to analysis of elements present on the composite particle surface by using X-ray photoelectron spectroscopy (XPS). Specifically, the XPS peak intensity ratio (A) was determined by the following expression (2) from: a peak intensity of $Ni2p_{3/2}$ derived from NCM or NCA in a differential XPS profile wherein the peak intensity of $Ni2p_{3/2}$ is acquired by subtracting the peak of $Ni2p_{3/2}$ derived from LMP and normalized with respect to the peak of P2p of the positive electrode active material composite or the positive electrode active material mixture from the peak of $Ni2p_{3/2}$ of the positive electrode active material composite or the positive electrode active material mixture; and a peak intensity of P2p and a peak intensity of C1s derived from LMP in the positive electrode active material composite or the positive electrode active material mixture. A lower value of the XPS peak intensity ratio (A) indicates that the composite particle surface is covered more with LMP. The results are shown in Table 1 and Table 2.

$$\text{XPS peak intensity ratio}(A) = (\text{a peak intensity of } Ni2p_{3/2})/((\text{a peak intensity of P2p}) + (\text{a peak intensity of C1s})) \qquad (2)$$

<<Evaluation of the Covering Strength of LMP on the Composite Particle Surface by X-Ray Photoelectron Spectroscopy>>

For all the positive electrode active material composites for a lithium-ion secondary battery excluding the positive electrode active material mixture p1 for a lithium-ion secondary battery, the positive electrode active material mixture x1 for a lithium-ion secondary battery and the positive electrode active material mixture p2 for a lithium-ion secondary battery obtained in Comparative Example 1, Comparative Example 9 and Comparative Example 10, after a predetermined shearing force was applied on the composite particles, the XPS peak intensity ratio for elements present on the composite particle surface was determined as in the above by using X-ray photoelectron spectroscopy; and the covering strength of LMP on NCM or NCA was evaluated from a ratio of XPS peak intensities before and after the application of the shearing force.

Specifically, 2 g of the obtained positive electrode active material composite for a lithium-ion secondary battery and 10 g of N-methyl-2-pyrrolidone were stirred and kneaded for 3 min at 2,000 rpm by using a high-speed mixer (Filmix Model 40L, manufactured by Primix Corp.). This was an emphasized simulation of a step of applying a positive electrode slurry on a current collector in a production process of a secondary battery, and there was exerted a force higher than a shearing force exerted on the positive electrode active material particles in the application step. The slurry after the stirring and kneading process was dried at 80° C. for 12 hours by using a warm-air drying machine to thereby obtain a positive electrode active material composite for a lithium-ion secondary battery. Thereafter, the obtained positive electrode active material composite for a lithium-ion secondary battery was subjected to X-ray photoelectron spectroscopy; then, the XPS peak intensity ratio (B) was determined by the calculation similar to the above expression (2), and thereafter, the covering strength ratio was determined by the following expression (3). If a value of the covering strength ratio is smaller and more close to 1, it indicates that LMP is covered more firmly on the composite particle surface. The results are shown in Table 1 and Table 2 together with the production condition of the positive electrode active material composites for a lithium-ion secondary battery.

Covering strength ratio=(an XPS peak intensity ratio $(B)$)/(an XPS peak intensity ratio$(A)$)     (3)

TABLE 1

| | Constituent Proportion of Lithium transition metal oxide Secondary Particle (A) (mass %) | | Lithium-based Polyanion Particle (B) | | | | Compositing Process | |
|---|---|---|---|---|---|---|---|---|
| | | | | Average Particle size (nm) | Amount of Carbon (c) Supported on Particle (B) Surface (mass % in 100 mass % of total amount of particle (B)) | | presence/ absence | (A):(B) (mass ratio) |
| | NCM-A | NCM-B | LMP | | $c1^{1)}$ | $c2^{2)}$ | | |
| Example 1 | 100 | 0 | LMP-A | 100 | 2.0 | 0.0 | present | 70:30 |
| Example 2 | 100 | 0 | LMP-B | 100 | 0.0 | 2.0 | present | 70:30 |
| Example 3 | 100 | 0 | LMP-A | 100 | 2.0 | 0.0 | present | 90:10 |
| Example 4 | 100 | 0 | LMP-D | 100 | 12.0 | 0.0 | present | 90:10 |
| Example 5 | 100 | 0 | LMP-A | 100 | 2.0 | 0.0 | present | 80:20 |
| Example 6 | 100 | 0 | LMP-E | 100 | 1.0 | 0.0 | prsssnt | 70:30 |
| Example 7 | 100 | 0 | LMP-I | 150 | 2.0 | 0.0 | present | 70:30 |
| Example 8 | 100 | 0 | LMP-J | 70 | 2.0 | 0.0 | present | 70:30 |
| Example 9 | 100 | 0 | LMP-F | 100 | 0.1 | 0.0 | present | 70:30 |
| Example 10 | 100 | 0 | LMP-F | 100 | 0.1 | 0.0 | present | 70:30 |
| Example 11 | 100 | 0 | LMP-F | 100 | 0.1 | 0.0 | present | 70:30 |
| Example 12 | 100 | 0 | LMP-F | 100 | 0.1 | 0.0 | present | 70:30 |
| Example 13 | 100 | 0 | LMP-F | 100 | 0.1 | 0.0 | present | 70:30 |
| Example 14 | 100 | 0 | LMP-F | 100 | 0.1 | 0.0 | present | 70:30 |
| Example 15 | 0 | 100 | LMP-A | 100 | 2.0 | 0.0 | present | 70:30 |
| Comp. Ex. 1 | 100 | 0 | LMP-A | 100 | 2.0 | 0.0 | absent | 70:30 |
| Comp. Ex. 2 | 100 | 0 | LMP-L | 10 | 0.0 | 0.0 | present | 70:30 |
| Comp. Ex. 3 | 100 | 0 | LMP-A | 100 | 2.0 | 0.0 | present | 99.5:0.5 |
| Comp. Ex. 4 | 100 | 0 | LMP-A | 100 | 2.0 | 0.0 | present | 50:50 |
| Comp. Ex. 5 | 100 | 0 | LMP-G | 100 | 0.05 | 0.0 | present | 70:30 |
| Comp. Ex. 6 | 100 | 0 | LMP-C | 100 | 18.0 | 0.0 | present | 70:30 |
| Comp. Ex. 7 | 100 | 0 | LMP-K | 10 | 2.0 | 0.0 | present | 70:30 |
| Comp. Ex. 8 | 100 | 0 | LMP-H | 500 | 2.0 | 0.0 | present | 70:30 |
| Comp. Ex. 9 | 0 | 100 | LMP-A | 100 | 2.0 | 0.0 | absent | 70:30 |

| | Compositing Process Water-Insoluble Carbon Powder | | XPS Peak Intensity | | |
|---|---|---|---|---|---|
| | Type | (c3) ((A) + (B)):(c3) (mass ratio) | XPS Peak Intensity Ratio (A) | XPS Peak Intensity Ratio (B) | Covering Strength Ratio |
| Example 1 | — | 100:0 | 0.02 | 0.02 | 1.0 |
| Example 2 | — | 100:0 | 0.02 | 0.02 | 1.0 |
| Example 3 | — | 100:0 | 0.03 | 0.03 | 1.0 |
| Example 4 | — | 100:0 | 0.03 | 0.03 | 1.0 |
| Example 5 | — | 100:0 | 0.02 | 0.02 | 1.0 |
| Example 6 | — | 100:0 | 0.02 | 0.02 | 1.0 |
| Example 7 | — | 100:0 | 0.02 | 0.02 | 1.0 |
| Example 8 | — | 100:0 | 0.02 | 0.02 | 1.0 |
| Example 9 | — | 100:0 | 0.02 | 0.02 | 1.0 |
| Example 10 | graphite | 99:1 | 0.02 | 0.02 | 1.0 |
| Example 11 | graphite | 90:10 | 0.02 | 0.02 | 1.0 |
| Example 12 | graphene | 99:1 | 0.02 | 0.02 | 1.0 |
| Example 13 | acetylene black | 99:1 | 0.02 | 0.02 | 1.0 |
| Example 14 | polyaniline | 99:1 | 0.02 | 0.02 | 1.0 |
| Example 15 | — | 100:0 | 0.02 | 0.02 | 1.0 |
| Comp. Ex. 1 | — | 100:0 | — | — | — |
| Comp. Ex. 2 | — | 100:0 | 0.06 | 0.63 | 10.5 |
| Comp. Ex. 3 | — | 100:0 | 0.54 | 0.54 | 1.0 |

TABLE 1-continued

| | | | | | |
|---|---|---|---|---|---|
| Comp. Ex. 4 | — | 100:0 | 0.02 | 0.02 | 1.0 |
| Comp. Ex. 5 | — | 100:0 | 0.04 | 0.56 | 14.0 |
| Comp. Ex. 6 | — | 100:0 | 0.02 | 0.02 | 1.0 |
| Comp. Ex. 7 | — | 100:0 | 0.35 | 0.38 | 1.1 |
| Comp. Ex. 8 | — | 100:0 | 0.46 | 0.58 | 1.3 |
| Comp. Ex. 9 | — | 100:0 | — | — | — |

[1] carbon derived from cellulose nanofibers
[2] carbon derived from glucose (water-soluble carbon material)

TABLE 2

| | Constituent Proportion of Lithium transition metal oxide Secondary Particle (A) (mass %) | | Lithium-based Polyanion Particle (B) | | | | Compositing Process | |
|---|---|---|---|---|---|---|---|---|
| | | | | Average Particle size (nm) | Amount of Carbon (c) Supported on Particle (B) Surface (mass % in 100 mass % of total amount of particle (B)) | | | |
| | NCM-A | NCA-A | LMP | | c1[1] | c2[2] | presence/absence | (A):(B) (mass ratio) |
| Example 16 | 0 | 100 | LMP-A | 100 | 2.0 | 0.0 | present | 70:30 |
| Example 17 | 0 | 100 | LMP-B | 100 | 0.0 | 2.0 | present | 70:30 |
| Example 18 | 0 | 100 | LMP-A | 100 | 2.0 | 0.0 | present | 90:10 |
| Example 19 | 0 | 100 | LMP-D | 100 | 12.0 | 0.0 | present | 90:10 |
| Example 20 | 0 | 100 | LMP-A | 100 | 2.0 | 0.0 | present | 80:20 |
| Example 21 | 0 | 100 | LMP-E | 100 | 1.0 | 0.0 | present | 70:30 |
| Example 22 | 0 | 100 | LMP-I | 150 | 2.0 | 0.0 | present | 70:30 |
| Example 23 | 0 | 100 | LMP-J | 70 | 2.0 | 0.0 | present | 70:30 |
| Example 24 | 0 | 100 | LMP-F | 100 | 0.1 | 0.0 | present | 70:30 |
| Example 25 | 0 | 100 | LMP-F | 100 | 0.1 | 0.0 | present | 70:30 |
| Example 26 | 0 | 100 | LMP-F | 100 | 0.1 | 0.0 | present | 70:30 |
| Example 27 | 0 | 100 | LMP-F | 100 | 0.1 | 0.0 | present | 70:30 |
| Example 28 | 0 | 100 | LMP-P | 100 | 0.1 | 0.0 | present | 70:30 |
| Example 29 | 0 | 100 | LMP-F | 100 | 0.1 | 0.0 | present | 70:30 |
| Example 30 | 50 | 50 | LMP-A | 100 | 2.0 | 0.0 | present | 70:30 |
| Comp. Ex. 10 | 0 | 100 | LMP-A | 100 | 2.0 | 0.0 | absent | 70:30 |
| Comp. Ex. 11 | 0 | 100 | LMP-L | 10 | 0.0 | 0.0 | present | 70:30 |
| Comp. Ex. 12 | 0 | 100 | LMP-A | 100 | 2.0 | 0.0 | present | 99.5:0.5 |
| Comp. Ex. 13 | 0 | 100 | LMP-A | 100 | 2.0 | 0.0 | present | 50:50 |
| Comp. Ex. 14 | 0 | 100 | LMP-G | 100 | 0.05 | 0.0 | present | 70:30 |
| Comp. Ex. 15 | 0 | 100 | LMP-C | 100 | 18.0 | 0.0 | present | 70:30 |
| Comp. Ex. 16 | 0 | 100 | LMP-K | 10 | 2.0 | 0.0 | present | 70:30 |
| Comp. Ex. 17 | 0 | 100 | LMP-H | 500 | 2.0 | 0.0 | present | 70:30 |

| | Compositing Process Water-Insoluble Carbon Powder (c3) | | XPS Peak Intensity | | Covering Strength Ratio |
|---|---|---|---|---|---|
| | Type | ((A) + (B)):(c3) (mass ratio) | XPS Peak Intensity Ratio (A) | XPS Peak Intensity Ratio (B) | |
| Example 16 | — | 100:0 | 0.03 | 0.03 | 1.0 |
| Example 17 | — | 100:0 | 0.03 | 0.03 | 1.0 |
| Example 18 | — | 100:0 | 0.04 | 0.04 | 1.0 |
| Example 19 | — | 100:0 | 0.04 | 0.04 | 1.0 |
| Example 20 | — | 100:0 | 0.03 | 0.03 | 1.0 |
| Example 21 | — | 100:0 | 0.03 | 0.03 | 1.0 |
| Example 22 | — | 100:0 | 0.03 | 0.03 | 1.0 |
| Example 23 | — | 100:0 | 0.03 | 0.03 | 1.0 |
| Example 24 | — | 100:0 | 0.03 | 0.03 | 1.0 |
| Example 25 | graphite | 99:1 | 0.03 | 0.03 | 1.0 |
| Example 26 | graphite | 90:10 | 0.03 | 0.03 | 1.0 |
| Example 27 | graphene | 99:1 | 0.03 | 0.03 | 1.0 |
| Example 28 | acetylene black | 99:1 | 0.03 | 0.03 | 1.0 |
| Example 29 | polyaniline | 99:1 | 0.03 | 0.03 | 1.0 |
| Example 30 | — | 100:0 | 0.03 | 0.03 | 1.0 |
| Comp. Ex. 10 | — | 100:0 | — | — | — |
| Comp. Ex. 11 | — | 100:0 | 0.06 | 0.63 | 10.5 |
| Comp. Ex. 12 | — | 100:0 | 0.58 | 0.58 | 1.0 |
| Comp. Ex. 13 | — | 100:0 | 0.03 | 0.03 | 1.0 |
| Comp. Ex. 14 | — | 100:0 | 0.04 | 0.60 | 15.0 |
| Comp. Ex. 15 | — | 100:0 | 0.03 | 0.03 | 1.0 |

TABLE 2-continued

| | | | | | |
|---|---|---|---|---|---|
| Comp. Ex. 16 | — | 100:0 | 0.32 | 0.39 | 1.2 |
| Comp. Ex. 17 | — | 100:0 | 0.44 | 0.61 | 1.4 |

[1] carbon derived from cellulose nanofibers
[2] carbon derived from glucose (water-soluble carbon material)

<<Amount of Transition Metals Dissolved Out in the Electrolyte Solution>>

The positive electrode active material composites for a lithium-ion secondary battery or the positive electrode active material mixtures for a lithium-ion secondary battery obtained in Examples 1 to 30 and Comparative Examples 1 to 17 were used as positive electrode active materials, and positive electrodes of lithium-ion secondary batteries were produced. Specifically, an obtained positive electrode active material composite for a lithium-ion secondary battery or positive electrode active material mixture for a lithium-ion secondary battery and an acetylene black and a polyvinylidene fluoride were mixed in a blend proportion of 90:5:5; N-methyl-2-pyrrolidone was added thereto and fully kneaded to thereby prepare a positive electrode slurry. The positive electrode slurry was applied on a current collector composed of an aluminum foil of 20 μm in thickness by using a coating machine, and was subjected to vacuum drying at 80° C. for 12 hours. Thereafter, the resultant was punched out into a disc shape of φ14 mm and pressed at 16 MPa for 2 min by using a hand press to thereby make a positive electrode.

Then, a coin-type secondary battery was structured by using the positive electrode. A negative electrode used was a lithium foil punched out into φ15 mm. An electrolyte solution used was a solution in which $LiPF_6$ was dissolved at a concentration of 1 mol/L in a mixed solvent of ethylene carbonate and ethyl methyl carbonate in a proportion of 3:7 in volume ratio. A separator used was a known one such as a polymer porous film of polypropylene or the like. These battery components were assembled and accommodated in an atmosphere of a dew point of −50° C. or less by a common method to thereby produce a coin-type secondary battery (CR-2032).

The obtained secondary battery was charged. Specifically, the secondary battery was subjected to a constant-current charge at a current of 170 mA/g up to a voltage of 4.5 V.

Thereafter, the secondary battery was disassembled; and the taken-out positive electrode was washed with dimethyl carbonate, and thereafter dipped in an electrolyte solution. The electrolyte solution at this time was one in which $LiPF_6$ was dissolved at a concentration of 1 mol/L in a mixed solvent of ethylene carbonate and ethyl methyl carbonate in a proportion of 3:7 in volume ratio. The electrolyte solution having the positive electrode dipped therein was put in a hermetically sealed vessel and allowed to stand at 70° C. for 1 week.

After the standing, the electrolyte solution from which the positive electrode had been taken out was filtered with a Dismic Filter of 0.45 μm, and acidolyzed with nitric acid. Mn, Ni and Co derived from NCM or Al, Ni and Co derived from NCA contained in the acidolyzed electrolyte solution were quantitatively determined by using ICP atomic emission spectrometry. The results are shown in Table 3 and Table 4.

TABLE 3

| | Amount of Transition Metals Dissolved out from Electrode (mass %) | | |
|---|---|---|---|
| | Mn | Co | Ni |
| Example 1 | 1.2 | 0.8 | 0.9 |
| Example 2 | 1.3 | 0.9 | 0.9 |
| Example 3 | 1.8 | 1.0 | 1.2 |
| Example 4 | 1.7 | 1.0 | 1.2 |
| Example 5 | 1.5 | 1.0 | 1.0 |
| Example 6 | 1.2 | 0.8 | 0.8 |
| Example 7 | 1.2 | 0.8 | 0.9 |
| Example 8 | 1.3 | 0.8 | 0.9 |
| Example 9 | 2.5 | 1.7 | 1.6 |
| Example 10 | 1.1 | 0.8 | 0.7 |
| Example 11 | 1.1 | 0.8 | 0.8 |
| Example 12 | 1.1 | 0.7 | 0.8 |
| Example 13 | 1.0 | 0.8 | 0.7 |
| Example 14 | 1.2 | 0.7 | 0.7 |
| Example 15 | 0.9 | 0.4 | 0.4 |
| Comparative Example 1 | 10.0 | 1.1 | 1.7 |
| Comparative Example 2 | 9.8 | 1.1 | 1.6 |
| Comparative Example 3 | 7.8 | 1.0 | 1.3 |
| Comparative Example 4 | 1.2 | 1.0 | 0.9 |
| Comparative Example 5 | 7.6 | 1.1 | 1.4 |
| Comparative Example 6 | 1.1 | 0.8 | 0.8 |
| Comparative Example 7 | 5.8 | 1.0 | 1.1 |
| Comparative Example 8 | 5.8 | 0.9 | 1.1 |
| Comparative Example 9 | 6.9 | 0.7 | 2.6 |

TABLE 4

| | Amount of Transition Metals Dissolved out from Electrode (mass %) | | | |
|---|---|---|---|---|
| | Al | Mn | Co | Ni |
| Example 16 | 0.1 | 0.0 | 0.1 | 0.2 |
| Example 17 | 0.1 | 0.0 | 0.2 | 0.2 |
| Example 18 | 0.3 | 0.0 | 0.3 | 0.4 |
| Example 19 | 0.3 | 0.0 | 0.4 | 0.3 |
| Example 20 | 0.2 | 0.0 | 0.3 | 0.3 |
| Example 21 | 0.1 | 0.0 | 0.1 | 0.1 |
| Example 22 | 0.1 | 0.0 | 0.1 | 0.2 |
| Example 23 | 0.2 | 0.0 | 0.1 | 0.2 |
| Example 24 | 0.3 | 0.0 | 0.4 | 0.4 |
| Example 25 | 0.1 | 0.0 | 0.1 | 0.1 |
| Example 26 | 0.2 | 0.0 | 0.2 | 0.2 |
| Example 27 | 0.2 | 0.0 | 0.1 | 0.1 |
| Example 28 | 0.2 | 0.0 | 0.2 | 0.1 |
| Example 29 | 0.1 | 0.0 | 0.1 | 0.1 |
| Example 30 | 0.1 | 0.5 | 0.2 | 0.5 |
| Comparative Example 10 | 1.0 | 0.0 | 1.0 | 1.2 |
| Comparative Example 11 | 0.5 | 0.0 | 0.7 | 0.9 |
| Comparative Example 12 | 0.5 | 0.0 | 0.5 | 0.6 |

TABLE 4-continued

| | Amount of Transition Metals Dissolved out from Electrode (mass %) | | | |
|---|---|---|---|---|
| | Al | Mn | Co | Ni |
| Comparative Example 13 | 0.2 | 0.0 | 0.2 | 0.2 |
| Comparative Example 14 | 0.7 | 0.0 | 0.7 | 0.9 |
| Comparative Example 15 | 0.2 | 0.0 | 0.2 | 0.3 |
| Comparative Example 16 | 0.3 | 0.0 | 0.2 | 0.4 |
| Comparative Example 17 | 0.2 | 0.0 | 0.2 | 0.4 |

<<Evaluation of the High-Temperature Cycle Characteristic>>

The secondary batteries produced in the evaluation of the amount of transition metals dissolved out into the electrolyte solution were used and evaluated for the high-temperature cycle characteristic. Specifically, a battery was subjected to a constant-current charge at a current density of 85 mA/g up to a voltage of 4.25 V and a constant-current discharge at a current density of 85 mA/g down to an end voltage of 3.0 V, and the discharge capacity of a current density of 85 mA/g (0.5 CA) was determined. Further the battery was subjected to a 100-cycle repeating test under the same charge and discharge condition, and the capacity retention rate (%) was determined by the following expression (4). Here, the charge and discharge test was wholly carried out at 45° C.

The results are shown in Table 5 and Table 6.

Capacity retention rate(%)=(a discharge capacity after 100 cycles)/(a discharge capacity after one cycle)×100    (4)

<<Evaluation of the Rate Characteristic>>

The secondary batteries produced in the evaluation of the amount of transition metals dissolved out into the electrolyte solution were used and evaluated for the rate characteristic. Specifically, a battery was subjected to a constant-current charge at a current density of 34 mA/g up to a voltage of 4.25 V and a constant-current discharge at a current density of 34 mA/g down to an end voltage of 3.0 V, and the discharge capacity of a current density of 34 mA/g was determined. Further the battery was subjected to a constant-current charge under the same condition and then to a constant-current discharge at a current density of 510 mA/g down to an end voltage of 3.0 V, and the discharge capacity of a current density of 510 mA/g was determined. Here, the charge and discharge test was carried out at 30° C.

The capacity ratio (%) was determined by the following expression (5) from the obtained discharge capacities. The results are shown in Table 5 and Table 6.

Capacity ratio(%)=(a discharge capacity at a current density of 510 mA/g)/(a discharge capacity at a current density of 34 mA/g)×100    (5)

TABLE 5

| | Secondary Battery Characteristic | | | |
|---|---|---|---|---|
| | | Rate Characteristic | | |
| | Capacity | Discharge Capacity (mAhg$^{-1}$) | | |
| | Retention Rate (%) | Current Density 34 mAg$^{-1}$ | Current Density 510 mAg$^{-1}$ | Capacity Ratio (%) |
| Example 1 | 88 | 143 | 126 | 88.1 |
| Example 2 | 89 | 143 | 125 | 87.4 |
| Example 3 | 87 | 151 | 135 | 89.4 |
| Example 4 | 88 | 149 | 135 | 90.6 |
| Example 5 | 89 | 147 | 133 | 90.5 |
| Example 6 | 86 | 144 | 123 | 85.4 |
| Example 7 | 86 | 143 | 123 | 86.0 |
| Example 8 | 87 | 142 | 127 | 89.4 |
| Example 9 | 83 | 140 | 118 | 84.3 |
| Example 10 | 91 | 146 | 131 | 89.7 |
| Example 11 | 90 | 141 | 128 | 90.8 |
| Example 12 | 91 | 145 | 129 | 89.0 |
| Example 13 | 90 | 146 | 130 | 89.0 |
| Example 14 | 90 | 147 | 130 | 88.4 |
| Example 15 | 89 | 159 | 140 | 88.1 |
| Comparative Example 1 | 68 | 145 | 110 | 75.9 |
| Comparative Example 2 | 72 | 128 | 83 | 64.8 |
| Comparative Example 3 | 74 | 155 | 137 | 88.4 |
| Comparative Example 4 | 87 | 128 | 92 | 71.9 |
| Comparative Example 5 | 76 | 134 | 85 | 63.4 |
| Comparative Example 6 | 88 | 129 | 89 | 69.0 |
| Comparative Example 7 | 77 | 138 | 99 | 71.7 |
| Comparative Example 8 | 76 | 128 | 79 | 61.7 |
| Comparative Example 9 | 55 | 158 | 121 | 76.6 |

TABLE 6

| | Secondary Battery Characteristic | | | |
|---|---|---|---|---|
| | | Rate Characteristic | | |
| | Capacity | Discharge Capacity (mAhg$^{-1}$) | | |
| | Retention Rate (%) | Current Density 34 mAg$^{-1}$ | Current Density 510 mAg$^{-1}$ | Capacity Ratio (%) |
| Example 16 | 78 | 164 | 140 | 85.1 |
| Example 17 | 79 | 164 | 140 | 85.4 |
| Example 18 | 78 | 176 | 152 | 86.4 |
| Example 19 | 77 | 175 | 155 | 88.6 |
| Example 20 | 79 | 169 | 150 | 88.5 |
| Example 21 | 77 | 165 | 138 | 83.4 |
| Example 22 | 76 | 165 | 137 | 83.0 |
| Example 23 | 77 | 163 | 142 | 87.4 |
| Example 24 | 73 | 161 | 133 | 82.3 |
| Example 25 | 81 | 167 | 145 | 86.7 |
| Example 26 | 80 | 162 | 144 | 88.8 |
| Example 27 | 81 | 165 | 144 | 87.0 |
| Example 28 | 81 | 166 | 144 | 87.0 |
| Example 29 | 80 | 169 | 146 | 86.4 |
| Example 30 | 78 | 153 | 133 | 86.9 |
| Comparative Example 10 | 60 | 166 | 121 | 72.9 |
| Comparative Example 11 | 62 | 151 | 95 | 62.8 |
| Comparative Example 12 | 64 | 183 | 158 | 86.4 |

TABLE 6-continued

| | Secondary Battery Characteristic | | | |
|---|---|---|---|---|
| | | | Rate Characteristic | |
| | Capacity | Discharge Capacity (mAhg$^{-1}$) | | |
| | Retention Rate (%) | Current Density 34 mAg$^{-1}$ | Current Density 510 mAg$^{-1}$ | Capacity Ratio (%) |
| Comparative Example 13 | 77 | 151 | 106 | 69.9 |
| Comparative Example 14 | 66 | 157 | 95 | 60.4 |
| Comparative Example 15 | 79 | 142 | 95 | 67.0 |
| Comparative Example 16 | 67 | 158 | 110 | 69.7 |
| Comparative Example 17 | 67 | 142 | 83 | 58.7 |

As is clear from Table 5 or Table 6, it found that the lithium-ion secondary batteries using, as positive electrode active materials, the positive electrode active material composites for a lithium-ion secondary battery obtained in the Examples were excellent in both the high-temperature cycle characteristic and the rate characteristic, as compared with the lithium-ion secondary batteries using, as positive electrode active materials, the positive electrode active material composites for a lithium-ion secondary battery or the positive electrode active material mixtures for a lithium-ion secondary battery obtained in the Comparative Examples.

Further as is clear from Table 3 or Table 4, it found that the lithium-ion secondary batteries using, as positive electrode active materials, the positive electrode active material composites for a lithium-ion secondary battery obtained in the Examples were smaller in the amounts of transition metals dissolved out from electrode into the electrolyte solution and were excellent in the durability, as compared with the lithium-ion secondary batteries using, as positive electrode active materials, the positive electrode active material composites for a lithium-ion secondary battery or the positive electrode active material mixtures for a lithium-ion secondary battery obtained in the Comparative Examples.

The invention claimed is:

1. A positive electrode active material composite for a lithium-ion secondary battery, the positive electrode active material composite comprises:
   lithium transition metal oxide secondary particles (A) each composed of one or more of lithium transition metal oxide particles, and
   lithium-based polyanion particles (B),
   wherein the lithium-based polyanion particles (B) are composited with the lithium transition metal oxide particles and present only on surfaces of the lithium transition metal oxide secondary particles (A),
   wherein the lithium transition metal oxide particles are represented by the following formula (I):

$LiNi_aCo_bMn_cM^1_xO_2$ (I) 

wherein M$^1$ denotes one or more elements selected from the group consisting of Mg, Ti, Nb, Fe, Cr, Si, Al, Ga, V, Zn, Cu, Sr, Mo, Zr, Sn, Ta, W, La, Ce, Pb, Bi and Ge; and a, b, c and x are numbers satisfying 0.3≤a<1, 0<b≤0.7, 0<c≤0.7, 0≤x≤0.3 and 3a+3b+3c+(a valence of M$^1$)×x=3,
   or the following formula (II):

$LiNi_dCo_eAl_fM^2_yO_2$ (II) 

wherein M$^2$ denotes one or more elements selected from the group consisting of Mg, Ti, Nb, Fe, Cr, Si, Ga, V, Zn, Cu, Sr, Mo, Zr, Sn, Ta, W, La, Ce, Pb, Bi and Ge; and d, e, f and y are numbers satisfying 0.4≤d<1, 0<e≤0.6, 0<f≤0.3, 0≤y≤0.3 and 3d+3e+3f+(a valence of M$^2$)×y=3,
   wherein the lithium-based polyanion particles (B) are represented by the following formula (III) or (III)':

$Li_gMn_hFe_iM^3_zPO_4$ (III) 

wherein M$^3$ denotes Co, Ni, Ca, Sr, Y, Zr, Mo, Ba, Pb, Bi, La, Ce, Nd or Gd; and g, h, i and z denote numbers satisfying 0<g≤1.2, 0≤h≤1.2, 0≤i≤1.2, 0≤z≤0.3 and h+i≠0, and g+(a valence of Mn)×h+(a valence of Fe)×i+(a valence of M$^3$)×z=3, and $Mn_{h'}Fe_{i'}M^3_{z'}PO_4$ (III)' 

wherein M$^3$ has the same meaning as in the formula (III); and h', i' and z' in the above formula (III)' denote numbers satisfying 0≤h'≤1.2, 0≤i'≤1.2, 0≤z'≤0.3 and h'+i'≠0, and (a valence of Mn)×h'+(a valence of Fe)×i'+(a valence of M$^3$)×z'=3, and
   a carbon (c1) derived from cellulose nanofibers is supported on the surfaces of the lithium-based polyanion particles (B); and
   wherein an amount of the carbon (c1) derived from cellulose nanofibers is 0.1 mass % or more and less than 18 mass % in 100 mass % of the lithium-based polyanion particles (B);
   an average particle size of the lithium transition metal oxide secondary particles (A) is 1 to 25 μm;
   an average particle size of the lithium-based polyanion particles (B) is 70 to 150 nm; and
   a mass ratio of a content of the lithium transition metal oxide secondary particles (A) to a content of the lithium-based polyanion particles (B), ((A):(B)), is 80:20 to 70:30.

2. The positive electrode active material composite for a lithium-ion secondary battery according to claim 1, wherein the lithium-based polyanion particles (B) supporting the carbon (c1) derived from cellulose nanofibers have an electric conductivity in terms of a powder under 25° C. at a pressure of 20 MPa of 1×10$^{-7}$ S/cm or more.

3. The positive electrode active material composite for a lithium-ion secondary battery according to claim 1, wherein a water-insoluble carbon powder (c3) other than the carbon (c1) derived from cellulose nanofibers is composited with the lithium transition metal oxide secondary particles (A) and the lithium-based polyanion particles (B) supporting the carbon (c1) derived from cellulose nanofibers; and
   a content of the water-insoluble carbon powder (c3) is 0.5 to 17 parts by mass with respect to 100 parts by mass of a total amount of the lithium transition metal oxide secondary particles (A) and the lithium-based polyanion particles (B) supporting the carbon (c1) derived from cellulose nanofibers.

4. The positive electrode active material composite for a lithium-ion secondary battery according to claim 1, wherein a peak intensity ratio, ((a peak intensity of Ni2p$_{3/2}$)/(a peak intensity of P2p+a peak intensity of C1s)), is 0.05 or less;
   wherein the peak intensity ratio is calculated from the peak intensity of Ni2p$_{3/2}$ derived from the lithium transition metal oxide particles in a differential XPS profile, and the peak intensity of P2p and the peak intensity of C1s derived from LMP of the positive electrode active material composite for a lithium-ion secondary battery; and wherein the peak intensity of Ni2p$_{3/2}$ derived from the lithium transition metal oxide particles in a differential XPS profile is acquired by subtracting, from a peak intensity of Ni2p$_{3/2}$ of the positive electrode active material composite for a lithium-ion secondary battery by an X-ray photoelectron spectroscopy (XPS), the peak of Ni2p$_{3/2}$ derived from the lithium-based polyanion particles normalized with respect to the peak of P2p of the positive electrode active material composite for a lithium-ion secondary battery.

5. A lithium-ion secondary battery comprising, as a positive electrode active material, the positive electrode active material composite for a lithium-ion secondary battery according to claim 1.

6. A method for producing the positive electrode active material composite for a lithium-ion secondary battery according to claim 1, the method comprising a step of mixing and compositing lithium transition metal oxide secondary particles (A) and lithium-based polyanion particles (B) supporting the carbon (c1) derived from cellulose nanofibers while adding a compressive force and a shearing force.

7. A method for producing the positive electrode active material composite for a lithium-ion secondary battery according to claim 1, the method comprising a step of mixing and compositing lithium transition metal oxide secondary particles (A), lithium-based polyanion particles (B) supporting the carbon (c1) derived from cellulose nanofibers, and a water-insoluble carbon powder (c3) other than the carbon (c1) derived from cellulose nanofibers while adding a compressive force and a shearing force.

8. The method according to claim 6, wherein the compositing step is the one carried out in a hermetically sealed vessel equipped with an impeller rotating at a peripheral velocity of 15 to 45 m/s.

* * * * *